United States Patent [19]

Inui et al.

[11] 4,272,827

[45] Jun. 9, 1981

[54] DIVISION PROCESSING METHOD SYSTEM HAVING 2N-BIT PRECISION

[75] Inventors: Norio Inui, Yokohama; Noriaki Kume; Tetsuro Okamoto, both of Kawasaki, all of Japan

[73] Assignee: Fujitsu Limited, Tokyo, Japan

[21] Appl. No.: 21,011

[22] Filed: Mar. 16, 1979

Related U.S. Application Data

[63] Continuation-in-part of Ser. No. 816,799, Jul. 18, 1977, abandoned, which is a continuation of Ser. No. 582,362, May 30, 1975, abandoned.

[30] Foreign Application Priority Data

May 31, 1974 [JP] Japan .................................. 49-61510

[51] Int. Cl.³ .................................................. G06F 7/52
[52] U.S. Cl. ..................................... 364/764; 364/765; 364/745
[58] Field of Search ........................ 364/764, 765, 745

[56] References Cited

U.S. PATENT DOCUMENTS

| 3,389,379 | 6/1968 | Erickson et al. ................. 235/310 |
| 3,591,787 | 7/1971 | Freiman et al. .................. 364/767 |
| 3,777,132 | 12/1973 | Bennett, Jr. ...................... 364/765 |
| 3,787,673 | 1/1974 | Watson et al. .................... 364/736 |

OTHER PUBLICATIONS

Allen et al. "Double Precision Arithmetic" *IBM Tech. Disclosure Bulletin* vol. 5, No. 1, Jun. 1962, pp. 36-37.
Mifsud "A Multiple-Precision Division Algorithm" *Communications of the ACM* vol. 13, No. 11, Nov. 1970, pp. 666-668.

*Primary Examiner*—David H. Malzahn
*Attorney, Agent, or Firm*—Staas & Halsey

[57] ABSTRACT

A division processing system performs 2N-bit precision division processing by effectively using division processing circuitry with N-bit precision. The system performs the division with 2N-bit precision as follows:

$$\frac{C + D \times 2^{-n}}{A + B \times 2^{-n}}$$

(n=N: the number of digit positions in selected binary numbers A, B, C and D). The above expression is approximated to the form of $Q_1+Q_2\times 2-n$ ($Q_1$, $Q_2$: binary numbers). The binary numbers $Q_1$ and $Q_2$ are respectively operated on by the division processing circuitry with N-bit precision. By effective control, the error caused during the division processing of $Q_1$ is used as a part of the data for performing the division processing of $Q_2$, thus effectively transferring any error evolving during the processing of $Q_1$ to $Q_2$. The function is performed in a system having only four registers, each of N-bit capacity (precision), and an operation register, multiplication circuitry, division circuitry, and a shift circuit, affording proper control of data transfer between the registers.

13 Claims, 18 Drawing Figures

DIVISION PROCESSING METHOD SYSTEM HAVING 2N-BIT PRECISION

CROSS REFERENCE TO RELATED APPLICATION:

This is a continuation-in-part of U.S. application, Ser. No. 816,799, filed on July 18, 1977, now abandoned, which is a continuation of U.S. application, Ser. No. 582,362, filed on May 30, 1975, now abandoned.

FIELD OF THE INVENTION

This invention relates to a division processing system and, more particularly, to such a system having 2N-bit precision utilizing components of only N-bit precision.

STATE OF THE PRIOR ART

Conventional prior art systems provide only N-bit precision components. Hence, if 2N-bit precision is required (i.e., double the number of bits for any given N-bit system), conventional prior art processing would require expanding the capacity of the components to accommodate 2N-bits. The alternative of processing only N-bits, when 2N-bit data is involved, is unacceptable due to the extreme errors in the results which would arise. The expansion of a prior art N-bit system to accommodate double the number of bits introduces substantial expense in the overall processing system. That expense necessarily imposes limitations upon the bit precision of the processing system for a given cost factor.

Accordingly, it is and has been desired to achieve higher precision without increasing the cost of the components necessary for implementing a given process.

Accordingly, it is an object of this invention to afford 2N-bit precision in a processing system for 2N-bit data, utilizing only N-bit precision components.

It is a further object of this invention to afford an increased number of bits both in data handling capacity and in precision results in a processing system of reduced cost.

Yet another object of this invention is to double the data handling capacity and the precision of a processing system utilizing conventional components of only half the data handling capacity and precision, taken individually.

SUMMARY OF THE INVENTION

The present invention relates to a division processing system with 2N-bit precision, and, more particularly, to a division processing system with 2N-bit precision which is capable of performing the division of 2N-bit precision data by effectively using a division processing means of only N-bit precision.

For example, given two registers A and B each of N-bit capacity, and certain data which is 2N bits in length, the upper N bits of the said 2N bits are stored in the A register and the lower N bits are stored in the B register. Accordingly, the said data can be expressed in the form of $(A+B\times 2^{-n})$, (where n=N).

Likewise, given two registers C and D each of N-bit capacity, and certain other data 2N bits in length, the upper N bits of the said 2N bits are stored in the C register, and the lower N bits are stored in the D register. Accordingly, where n=N, the other said data can be expressed in the form of $(C+D\times 2^{-n})$.

Division with 2N-bit precision is performed in accordance with the invention, by the following calculation format:

$$\frac{C+D\times 2^{-n}}{A+B\times 2^{-n}}$$

(n=N: number of digital positions (1) in each of selected binary numbers A, B, C and D)

The above division calculation (1) may be construed as an application of conventional division of N-bit precision data; in that instance, however, the register, shift circuit and addition/subtraction circuit utilized must have a capacity for the requisite number of digits to maintain the 2N-bit precision required. Thus, where "N" as above defined is N=70, a prior art system would require 140 bit capacity for each component, as noted.

The present invention makes possible the division of 2N-bit precision data through the effective use of existing division process means providing only for N-bit precision data. For this purpose, the division process system of the invention, with 2N-bit precision, is characterized by performing division of 2N-bit precision, for the expression (1) above, wherein the expression (1) is approximated in the form of $$Q_1+Q_2\times 2^{-n} \quad (Q_1 \text{ and } Q_2: \text{ binary numbers}) \qquad (2)$$

and the said binary numbers $Q_1$ and $Q_2$ are respectively obtained by division processing of N-bit precision involving, as will be seen, the binary numbers A, B, C and D as dividends and/or divisors. Further, the data division circuit and the shift circuit are controlled so that error resulting during the division processing (to obtain $Q_1$) can be used as a part of the data for performing the further division processing (to obtain $Q_2$); that is to say, the error occurring in the calculation of $Q_1$ is transferred to the calculated value of $Q_2$ so that the error becomes less significant as a result.

DETAILED DESCRIPTION OF THE INVENTION

Figure 1:
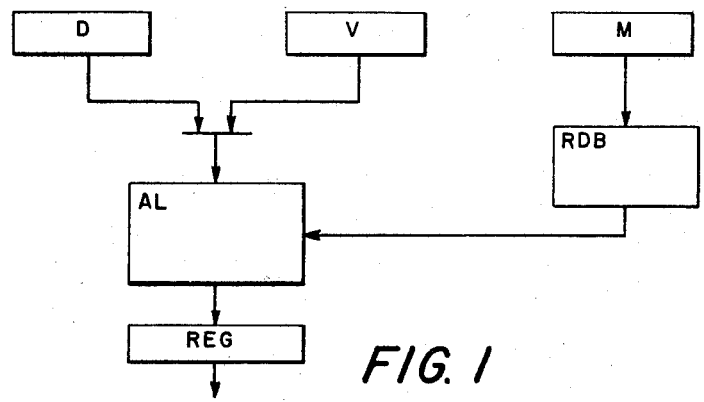
FIG. 1 is a block diagram for explaining the principle of the division processing method and system of the present invention.

FIG. 1 is a diagram for explaining the principle of the division processing means of the present invention. In this figure, D, V, M and REG are registers, AL is an arithmetic unit for performing addition, subtraction and multiplication, and RDB is a decoder for indexing the value necessary for division.

In general, if the division of data C by A is represented by C/A, the fractional value of C/A does not vary, even when both the dividend (numerator) C and the divisor (denominator) A are multipled by the same value $R_o$. Therefore, the following relation can be obtained.

$$C/A = CR_o/AR_o = CR_oR_1/AR_oR_1 = CR_oR_1R_2 \ldots /AR_oR_1R_2 \ldots \quad (3)$$

(where, $R_o, R_1, R_2 \ldots \neq 0$)

Using this fact, if the multiplier values of $R_o, R_1, R_2, \ldots$ are selected so that the divisor $A \cdot R_o \cdot R_1 \cdot R_2 \ldots$ approaches 1, then, when the dividend C is also multiplied by the values $R_o, R_1, R_2, \ldots$, the numerator ($C \cdot R_o \cdot R_1 \cdot R_2 \ldots$) obtained as a result approaches the quotient C/A.

For example, by reading the upper 9 bits of the divisor A with the decoder RDB (FIG. 1), the value $R_o$ which makes the value of $A \times R_o$ approach 1 within an error range of $2^{-7}$ can be tabulated in advance for convenience in indexing. Namely, the value of $R_o$ can be obtained from the divisor A. When the value of $R_o$ thus obtained is multiplied by the divisor A, the value of $A \times R_o$ approaches 1. If the error is given as $\chi$, the result is given by $1 \pm \chi$, resulting in $|\chi| \leq 2^{-7}$. This is because values of $R_o$ which bring about such result are previously determined and stored in correspondence to the values of A.

Additional processing is necessary to obtain the value of $A \cdot R_o \cdot R_1$, and in addition to determine the value of $R_1$. Specifically, since the value of $A \cdot R_o$ mentioned above generally can be expressed as $1 \pm \chi$, $R_1$ can be set equal to $(1 \mp \chi)$. $A \cdot R_o$ then can be multiplied by $R_1$ using the value $(1 \mp \chi)$ for $R_1$. The value $(1 - \chi^2)$ obtained as the result of the above multiplication $A \cdot R_o \cdot R_1$ then approaches 1 more closely, as compared with $A \cdot R_o = (1 \pm \chi)$ since $|\chi| << 1$.

In the practical calculation of $A \cdot R_o \cdot R_1$, first the operation of $A \cdot R_o \cdot R_1 = AR_o$. $(1 \mp \chi) = AR_o \mp AR_o\chi = AR_o + AR_oR_1'$ is performed, and then processing of $AR_o + AR_oR_1'$ is carried out with the condition of $R_1' = \mp \chi$.

The following is an explanation of the division of 5/6 using the above technique. The explanation will be given in a decimal notation. In FIG. 1, "6" is stored in the register M and "5" is stored in the register V. Under this condition, a setting is previously made so that when "6" is the input to the decoder RDB, the value "0.17" is produced as the output $R_o$.

Therefore, the operation of $6 \times 0.17$ is performed by arithmetic unit AL, and the resultant value "1.02" is set in the register D. Then, operation of $5 \times 0.17$ is performed and "0.85" is set in the register V.

Next, since "$1 - 1.02 = -0.02$", $R_1' = -0.02$, the operation $1.02 \times (-0.02)$ is executed and the result is added to the contents of register D. In other words, as a result of operation of "$1.02 + 1.02 \times (-0.02) = 1.02 - 0.0204 = 0.9996$", the value "0.9996" is set in the register. Similarly, the operation of "$0.85 + 0.85 \times (-0.02)$" is executed and, as a result, the value "0.8330" is set in the register V.

Since $5/6 = 0.83333 \ldots$, it is clear that the value "0.8330" is nearer to the value of 5/6 than was the value "0.85".

Since the value stored in the register D is "0.9996", an operation similar to the above one can be carried out using the value "$\chi = -0.0004$" and a more precise value (nearer to 5/6 can be obtained. In practical processing, when obtaining "$-0.02$" from "1.02", an operation for extracting only the lower digits need be executed, as it is clear that a value near "1" is represented by the upper digits.

Figure 2A:
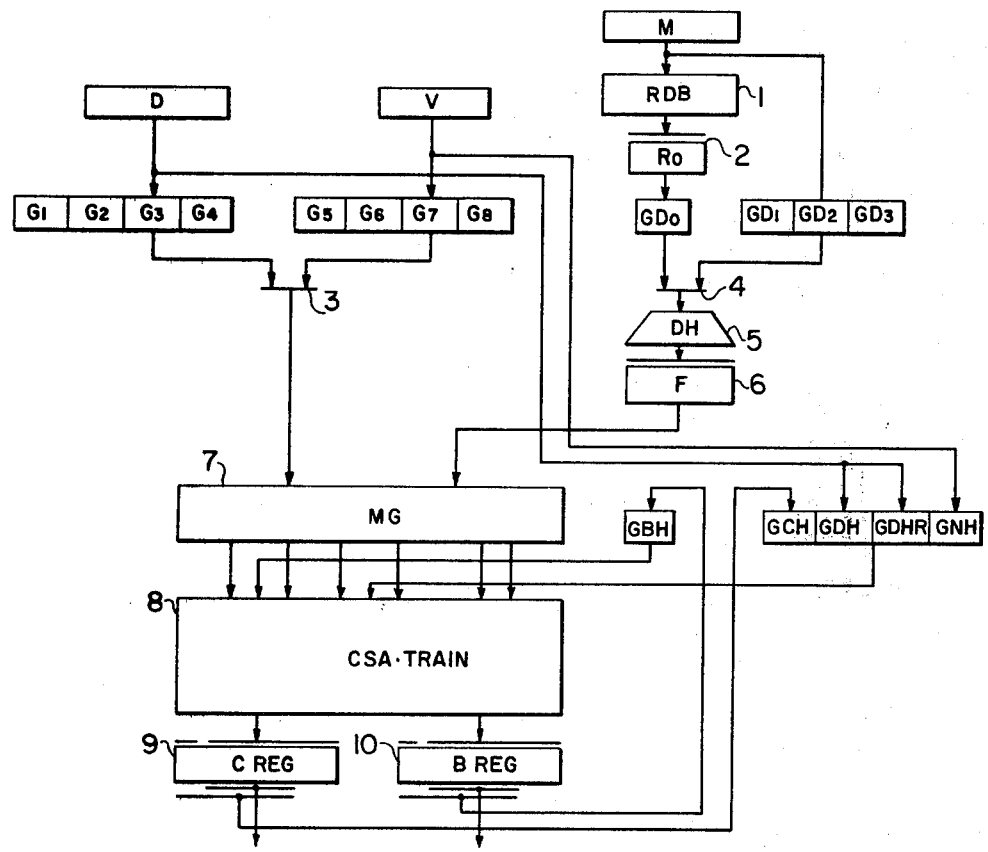
FIG. 2A is a more detailed block diagram of the division processing system of the invention.

A division processing system for N-bit precision data is shown in FIG. 2A. Referring to FIG. 2A, the numeral 1 denotes an RDB decoder for obtaining the value $R_o$ by indexing after reading the upper digits bits of the divisor; 2 is a register to which the value $R_o$ is set; $G_1, G_2, G_3, G_4, G_5, G_6, G_7, G_8$, GBH, GCH, GDH, GDHR, and GNH are each shift gate circuits; $GD_o, GD_1, GD_2$, and $GD_3$ are gate circuits; 3 and 4 are multiplexer-gate circuits; 5 is a decoder (DH) which reads the input data and supplies the shift information for performing multiplication, as the addition (or subtraction) of the appropriate, raised power of 2; 6 is a register (F); 7 is a multiplication gate circuit (MG) which shifts the data provided via the multiplexer gate 3 in the right or left direction according to the data given via the register (F) 6; 8 is a carry save adder train (CSA.-TRAIN) which sets the results of multiplication or division of data, as input to the multiplication gate circuit 7, to the registers 9 and 10; 9 and 10 are registers supplied to adders (not shown in this figure).

In general, each digit of the multiplicand and multiplier are multiplied and then added in order to perform multiplication. However, it is not always best to add the multiplication of each digit. For example, to perform a multiplication by 7, it is easier to subtract the result of multiplication by "1" from the result of multiplication by "8", than it is to perform the addition of the results of the respective multiplications by "1", "2", and "4", each case nevertheless corresponding to multiplication by the multiplicand, "7". In the case of multiplication by $2^n$, only the shaft of the multiplicand is required. Namely, in FIG. 2A, a certain multiplier is decoded by the decoder 5 into the most suitable form of multiplication (in above case, "$2^2, 2^1, 2^0$" is decoded into "$2^3, -2^0$") and the addition, that is, the final value of multiplication is obtained at the carry save adder train 8 by shifting the data being input via multiplexer gate 3 by using the above decoded data as the shift information. Of course, in the embodiment of the present invention, complicated decoding is carried out by the above-mentioned method.

Figure 2B:
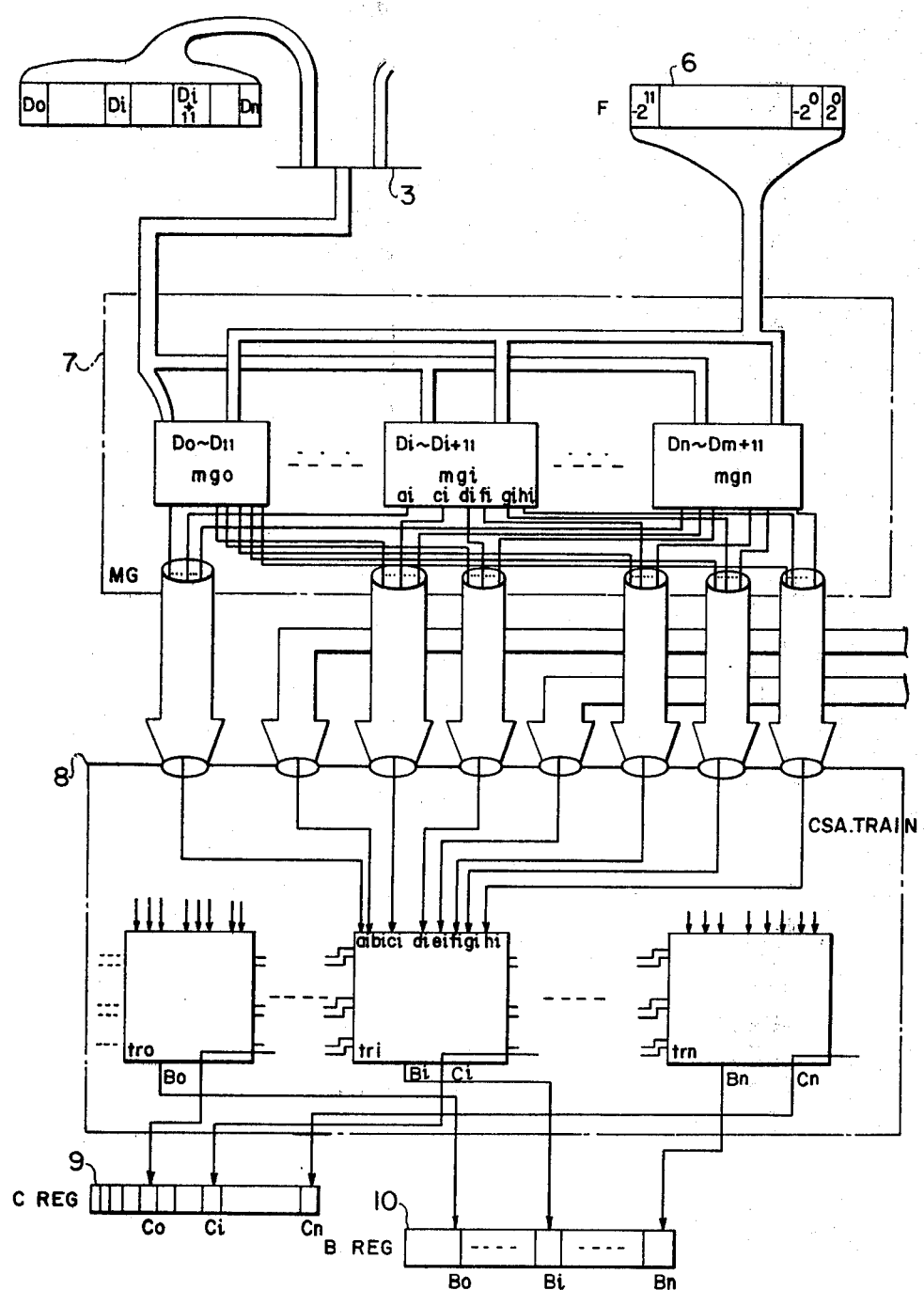
FIG. 2B is a detailed block diagram of the multiplication gate MG and the carry save adder train CSA TRAIN of FIG. 2A.

FIG. 2B is a detailed block diagram of the multiplication gate (MG) 7 and the carry save adder train (CSA TRAIN) 8 of FIG. 2A. In FIG. 2B, circuits corresponding to those of FIG. 2A are given the same symbols. The symbols mg0 to mgn respectively denote decoders which decode 12 bits of the n bits supplied to the MG gate 7 from gate 3, in accordance with the 21 bits of shift information from the F register 6, into a 6 bit pattern of bits a, c, d, f, g, and h. The symbols tro to trn respectively denote adders, each of which provides 4 stages of the carry save adder train 8, and is used for obtaining the addition of the 6-bit input of bits a to h.

The subscript i designates the bit number used for obtaining the respective $i^{th}$ bits of the C REG and the B REG. In other words, the 12 bits of bit i through bit i+11 among the n bits from gate 3 are decoded by decoder mgi of MG gate 7 into the six bits of ai, ci, di, fi, gi and hi in accordance with the value of the 21 bits from the F register 6 and added in the adder tri. Thus, the value of $i^{th}$ bit BI of the B REG is obtained from the $i^{th}$ adder tri. The $i^{th}$ carry bit, Ci, of the C REG then is obtained from the previous stage adder, tri+1.

Figure 2C:
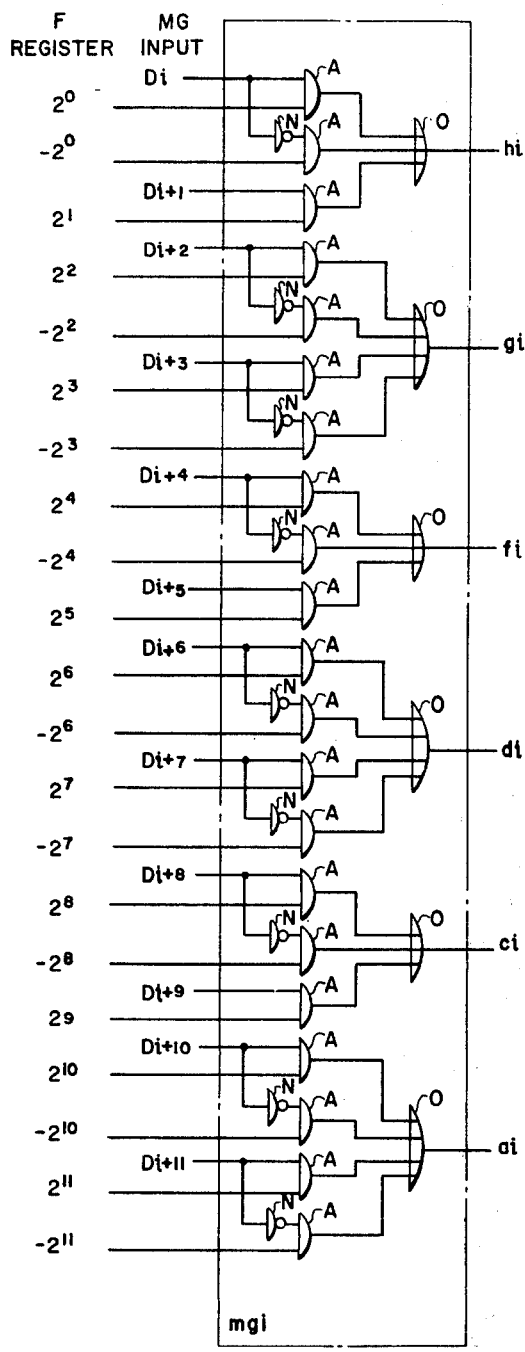
FIG. 2C is a logic diagram of the mg0 to mgn decoders of FIG. 2B.

FIG. 2C shows a logic circuit of one of the decoders mg0 to mgn in FIG. 2B, and is specifically designated as decoder mgi. In FIG. 2C, A denotes an AND circuit; 0, an OR circuit; and N, a NOR circuit. FIG. 2C illustrates how the 12 bits Di to Di+11 among the n bits supplied to the multiplication gate MG via the multiplexer gate 3 are decoded by the decoder mgi in accordance with the 21 bits from F register 6.

Figure 2E:
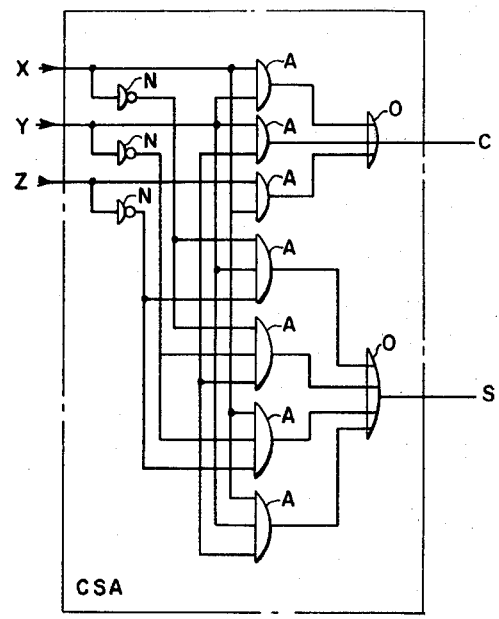
FIG. 2E is an example of a carry save adder circuit.
Figure 2D:
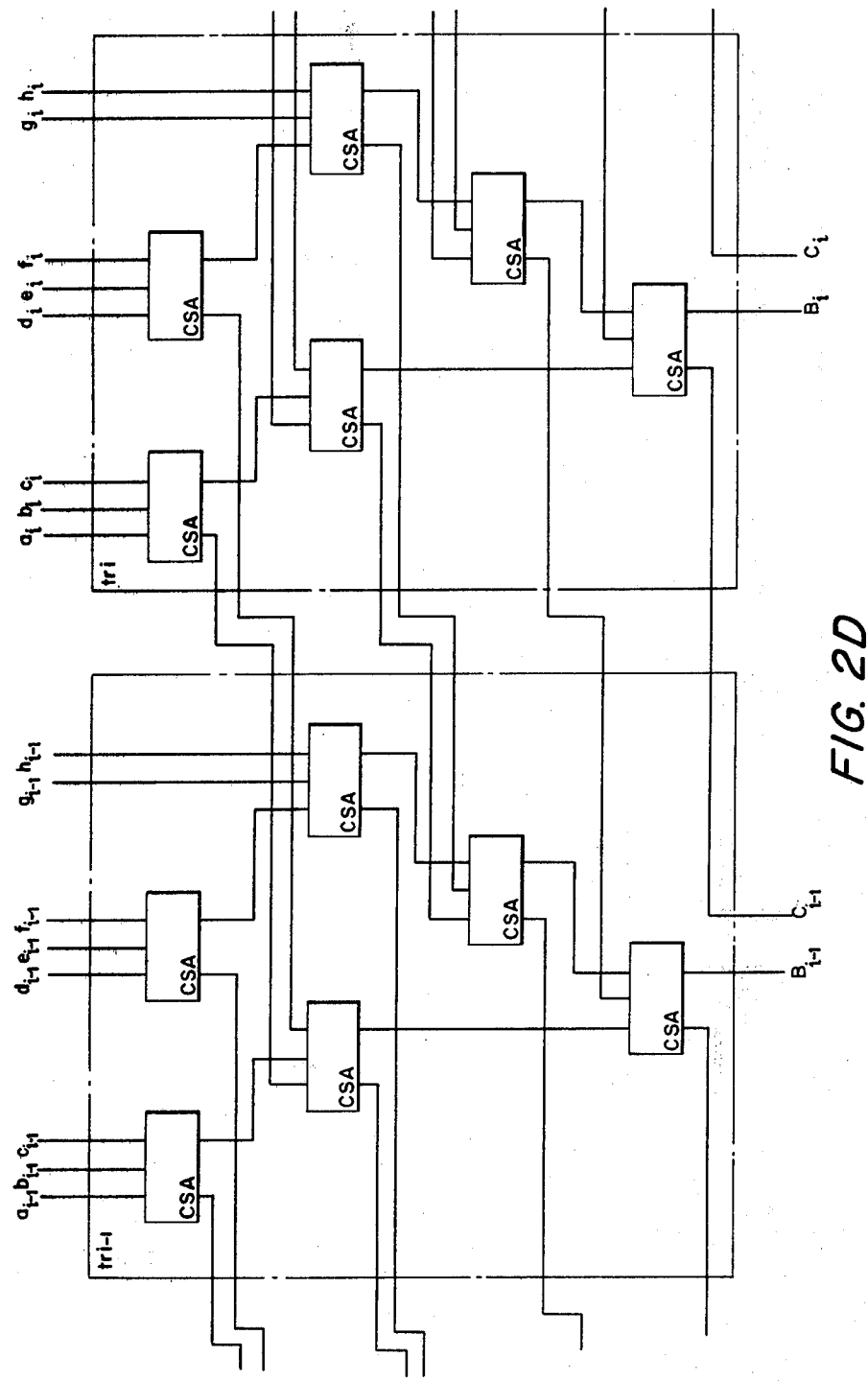
FIG. 2D is a detailed drawing of the adders $tr_i$ and $tr_{i-l}$ of the CSA.TRAIN of FIG. 2A and FIGS. 2B.

FIG. 2D is a more detailed block diagram of illustrative adders, tri and tri-1, of the adders tro to trn. In this figure, each block CSA is a carry save adder of the train thereof. One carry save adder CSA generates the sum of three inputs as two outputs, carry and sum. FIG. 2E is a common circuit diagram of each carry save adder CSA. X, Y and Z are the three inputs, and C and S, the outputs. A designates an AND circuit; 0, an OR circuit; and N, a NOR circuit. The relation of the two outputs, carry C and sum S, for the three inputs X, Y and Z is shown in the following table.

| X | 0 | 1 | 0 | 0 | 1 | 1 | 0 | 1 |
|---|---|---|---|---|---|---|---|---|
| Y | 0 | 0 | 1 | 0 | 1 | 0 | 1 | 1 |
| Z | 0 | 0 | 0 | 1 | 0 | 1 | 1 | 1 |
| S | 0 | 1 | 1 | 1 | 0 | 0 | 0 | 1 |
| C | 0 | 0 | 0 | 0 | 1 | 1 | 1 | 1 |

Figure 2F:
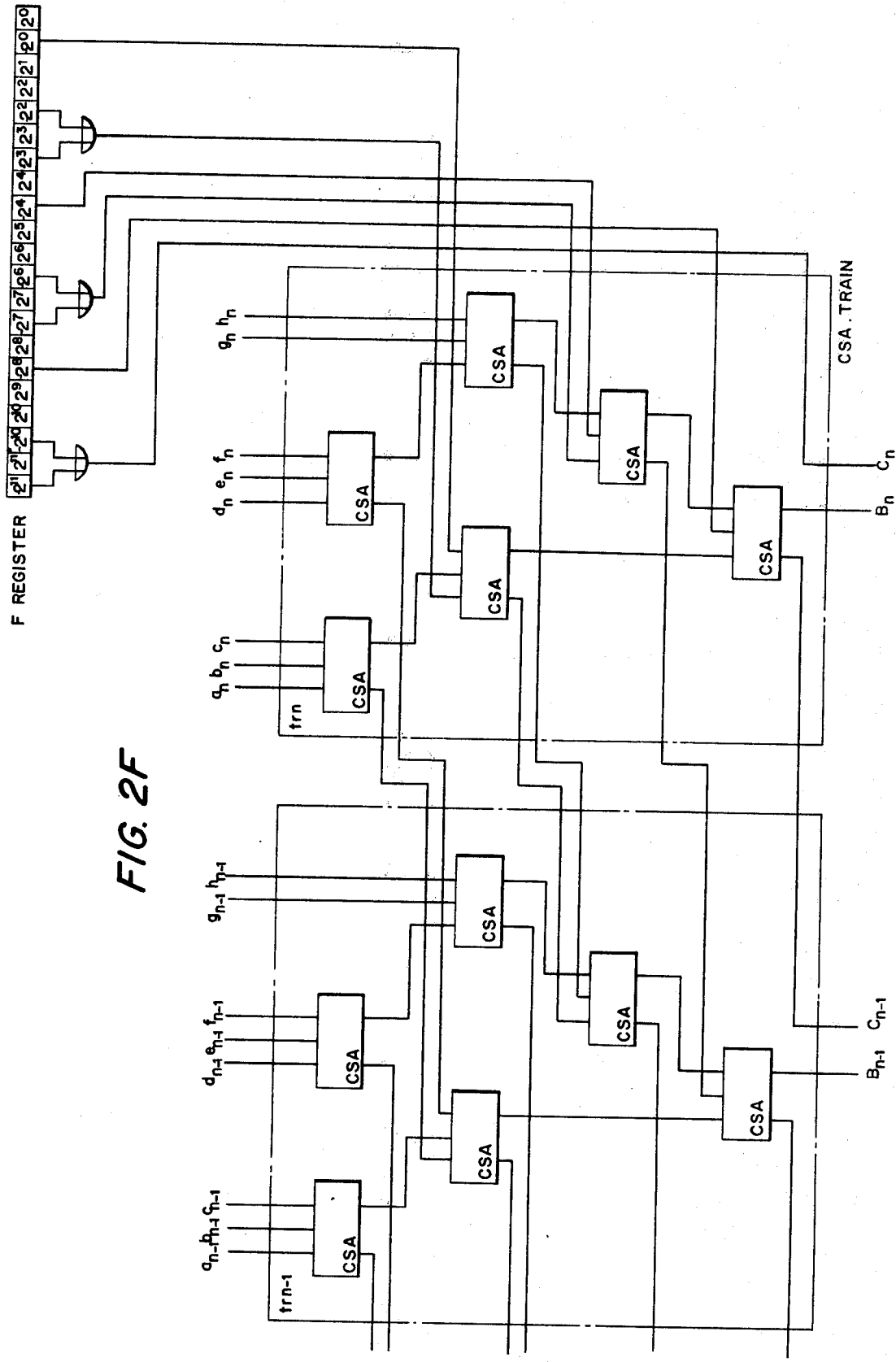
FIG. 2F is a detailed drawing of the $tr_{n-l}$ and $tr_n$ adders.

FIG. 2F shows that some modification is required to be made to the adder trn, according to the contents of the F register, as applied to the carry save adder train. This circuit is necessary for compensation since, as mentioned above, not only addition but also subtraction is used for performing multiplication.

Figure 3A:
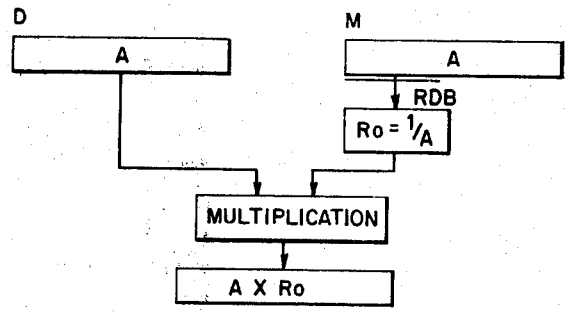
FIGS. 3A, 3B and 3C are a series of drawings for explaining the processing of the data in the N-bit precision division processing system of FIG. 2.

With reference to FIG. 3A, B and C, the process of division for N-bit precision data in the division processing circuitry for the above-mentioned N-bit precision is now explained.

FIG. 3A shows the multiplication of $R_o$ (determined by the use of the higher order bits of the divisor A set in the M register and the decoder RDB) by the divider A stored in the D register, to produce $A \cdot R_o$ (or $A \times R_o$).

Figure 3B:
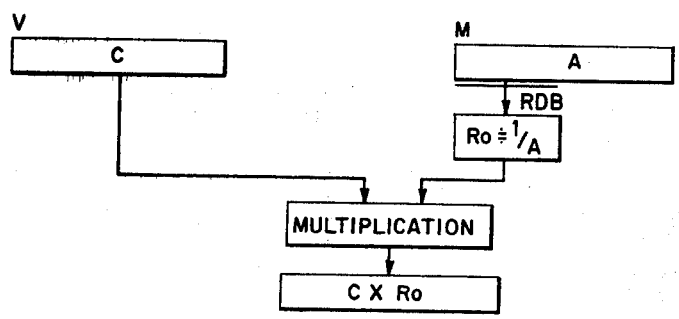

FIG. 3B shows the multiplication of the dividend C stored in the V register by the above-mentioned $R_o$, to yield $C \cdot R_o$ (or $C \times R_o$).

As mentioned in the explanation of FIG. 1, the value of $A \times R_o$ approaches 1 and, more specifically, the setting by decoder RDB as to a given value A is made so that $A \times R_o = 1 \pm \chi$, where $\chi \leq 2^{-7}$. For this value of $\chi$, the upper seven digits are either "0" or all "1". For example, if $\chi = 0.0000000101$, $1+\chi = 1.0000000101$, and $1-\chi = 0.1111111010$. Namely, the value of $R_1' = \mp \chi$ can be obtained by preparing the complement of 2 for the 8th digit, or 15 bits in the result.

Figure 3C:
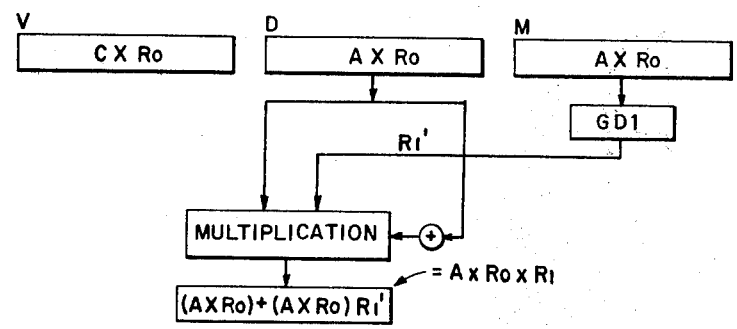

FIG. 3C shows the processing by which the value of $A \times R_o \times R_1$ is obtained. Briefly, 8 bits or 15 bits of the value $A \times R_o$ set in the M register are provided, through gate circuit GD1, as $R_1'$ which in turn is multiplied by $A \times R_o$ from register D to yield $(A \times R_o)R_1'$. The latter result is then summed with $(A \times R_o)$ from register D. That is to say, the output of GD1 is multiplied by the value $A \times R_o$ set in the D register, and the expression $A \times R_o \times R_1'$ is then added to $A \times R_o$ to yield a summation.

The summation $A \times R_o + (A \times R_o)R_1'$ yields the desired value $A \times R_o \times R_1$. Substituting C for A in FIG. 3C will yield, in like manner, $C \times R_o + (C \times R_o)R_1' = C \times R_o \times R_1$.

Accordingly, through the above process, division of N-bit precision represented by the quotient C/A can be accomplished by generating the product $C \cdot R_o \cdot R_1 \cdot R_2 \ldots$ in accordance with the value of $A \cdot R_o \cdot R_1 \cdot R_2 \ldots$ approaching 1.

The present invention provides division with 2N-bit precision, using division processing circuitry of only N-bit precision, as mentioned above. Namely, when division of double length (2N) precision data is given in the form of $$\frac{C + D \times 2^{-70}}{A + B \times 2^{-70}} \tag{4}$$

this calculation (4) may be approximated by the following equivalent expressions:

$$\left(\frac{C}{A}\right) \times \left(\frac{1 + \frac{D}{C} \times 2^{-70}}{1 + \frac{B}{A} \times 2^{-70}}\right) \tag{5}$$

$$\approx \frac{C}{A} \times \left\{ 1 + \left(\frac{D}{C} - \frac{B}{A}\right) \times 2^{-70} \right\} \tag{6}$$

$$\approx \frac{C}{A} + \left(\frac{D}{A} - \frac{BC}{A^2}\right) \times 2^{-70} \tag{7}$$

In accordance with this approximation (7), if the result of the operation C/A is stored in a register W of 70 bits, and the result of $(D/A - BC/A^2)$ is stored in a register D, a resulting quotient comprising data of 2N-bit precision can be obtained basically as the sum of the W register data and the D register data (the latter times $2^{-70}$), or $W + D \times 2^{-70}$.

However, several of the lower bits of the W register value comprising the operational result of C/A will be in error, any such operation, of course, always being accompanied by a certain error. This error can be ignored for data of only 70 bits precision; but in the case of 140 bits precision, the error in the lower bits of the 70-bit data of the W register is located above the center of the 140 bits, and hence, even if the lower 70 bits were accurately obtained, the latter are useless as data (i.e., when the bits of orders in excess of 70 are in error, bits from 1 to 70 are useless).

Thus, the inherent error in an C/A operation results in considerable influence on the quotient of 2N bit precision data which is to be obtained. The present invention overcomes this problem (i.e., as to the said operation C/A) by transferring the error from C/A to the operations of $(D/A) \times 2^{-70}$ or $(BC/A^2) \times 2^{-70}$ (referring to Eq. (17)).

This transfer control operation is explained with reference to FIGS. 4A-4D—specifically, subparts (a) thru (1') thereof—at each operation step for the four registers, W, V, D and M.

In FIGS. 4A–4D, W, V, D and M represent operation registers; U, an adder; M', a multiplier; D', a divider; L, a logic operation circuit; and S, a shift circuit, respectively. The inventive method and system of the present specification comprise steps and functions (a)–(1'), which steps and functions are pictorially set forth in correspondingly labeled subparts (a)–(1') of FIGS. 4A thru 4D of the drawings.

Figure 4A:
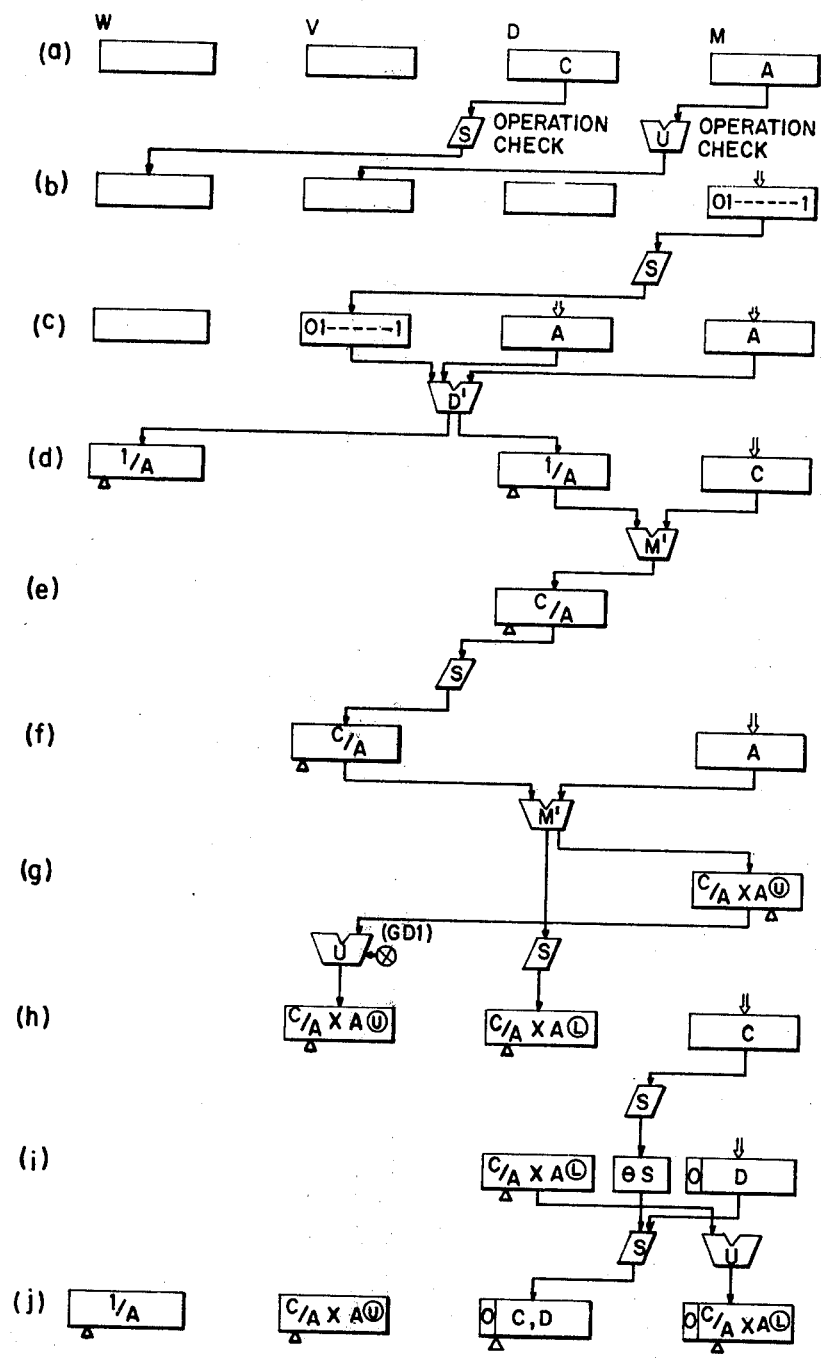
FIGS. 4A, 4B, 4C and 4D show an example of processing operations of the controlled data transfer in the 2N-bit precision division process system of the present invention utilizing components individually capable of processing operations only with N-bit precision.

(1) Referring to FIG. 4A, in steps (a) and (b), C is set in the D register and is checked by passing it through shift circuit S to register W, and A is stored in register M and is checked by passing it through adder U to register V. These checks are mere operational checks (not critical to the invention disclosed in detail below), whereby the numbers are checked—for example, to make sure that the values are greater than $\frac{1}{2}$ and less than 1.

(2) Referring to steps (c) and (d), the value 1/A is obtained as follows: a value of A is stored in each of registers D and M, and the value "1" is stored in register V, the latter being accomplished during step (c). Then, in the manner described previously with reference to FIGS. 1 and 3, division of the value "1" by the value A is accomplished in divider D', with the results 1/A being stored, during step (d), in both registers W and D. Therefore, it should be noted that the operation 1/A is carried out by using the registers V, D, and M, shift circuit S and divider D', and the result 1/A is set in each of the registers W and D (see subpart (d) of FIG. 4A). The division 1/A can be, and is preferably, performed by division of N bit precision, in accordance with the procedure previously explained with reference to FIGS. 3A, B and C, with the dividend set to the value "1" and using the configuration shown in FIG. 1.

(3) The operation C/A is carried out through the processes shown in FIG. 4A, subparts or steps (d), (e), (f), and the result is set in the register V (subpart (f)). This result naturally includes an error arising out of the calculation. This error cannot be ignored, since it would introduce substantial error in the final quotient obtained. It should be recalled that the result of C/A is not multiplied by $2^{-70}$, as is the second term of equation (7). In addition, it is to be noted that the results of division operation are always to be shifted two places to the right, for the following reason. The significant figures of both dividend and divisor appear from the second bits of each form in binary notation; that is, the value of each is greater than $\frac{1}{2}$ and less than 1. However, in some cases, the division result may be greater than 1. For example, if the dividend is close to 1, and the divisor close to $\frac{1}{2}$, the quotient will be close to 2. On the other hand, a number having absolute value greater than or equal to 1 cannot be expressed in binary floating point notation. It is, therefore, necessary to shift the division result two places to the right.

(4) As noted above, according to the present invention, this error is transferred to the operation of $D/A \times 2^{-70}$ (or $BC/A^2 \times 2^{-70}$), and this takes place in FIG. 4A, steps (f), (g), (h). In this way, acceptable accuracy in the final results of the operation of $C/A + D/A \times 2^{-70}$ is obtained. More specifically, during step (f), the value C/A is moved, via shift circuit S, from the D register to the V register. The value A is set in the M register. Then, during step (g), C/A is multiplied by A by means of an iterative operation, and the upper N bits of the product are provided to the M register (step (g)), while the lower N bits are provided, via shift circuit S, to the D register during step (h). The upper N bits of the product, held in the M register during step (g), are then provided via operation check circuit U—with the carry value from the lower N bits being added in—to the V register (step (h)). Thus, in FIG. 4A, steps (f), (g), (h), the divisor A is multiplied (in multiplier M') by the result of the operation C/A, including the error, as mentioned in (3) above, and the value $C' = C/A \times A$ including the above error is set in each of register V and register D as the data of 2N bit precision. Specifically, referring to steps (g) and (h), for the data $C/A \times A$ of 2N bit precision, the upper N bits $C/A \times A(U)$ are set in register V, and the lower N bits $C/A \times A(L)$ are set in register D.

(5) In steps (h), (i), (j), the dividends C and $D \times 2^{-70}$ are combined and set (via shift circuit S) in register D as value C, D. More specifically, the value C stored in the M register and the value D stored in the M register are, during steps (h) and (i), respectively, shifted two places to the right in shift circuit S to compensate for the fact that the quotient C/A obtained above was shifted by two places automatically after the division result was obtained during step (d)—see paragraph (3) above. The two rightmost bits from value C—constituting a "drop-out" due to shift—are stored, during step (i), in a $\theta S$ register. The value D in register M, now shifted two places to the right, is combined in shifter S during step (i) with the two rightmost bits from the $\theta S$ register, such combination taking place in shift circuit S, with the result (O/C, D) being stored during step (j) in the D register. It is to be noted that the lowermost two bits of D are, after the shifting operation during step (i), not saved or utilized further. Finally, during step (j), the contents $C/A \times A(L)$ of register D are transferred, via adder U, so as to be stored during (j) in register M as (O/C-/A×A(L)).

Figure 4B:
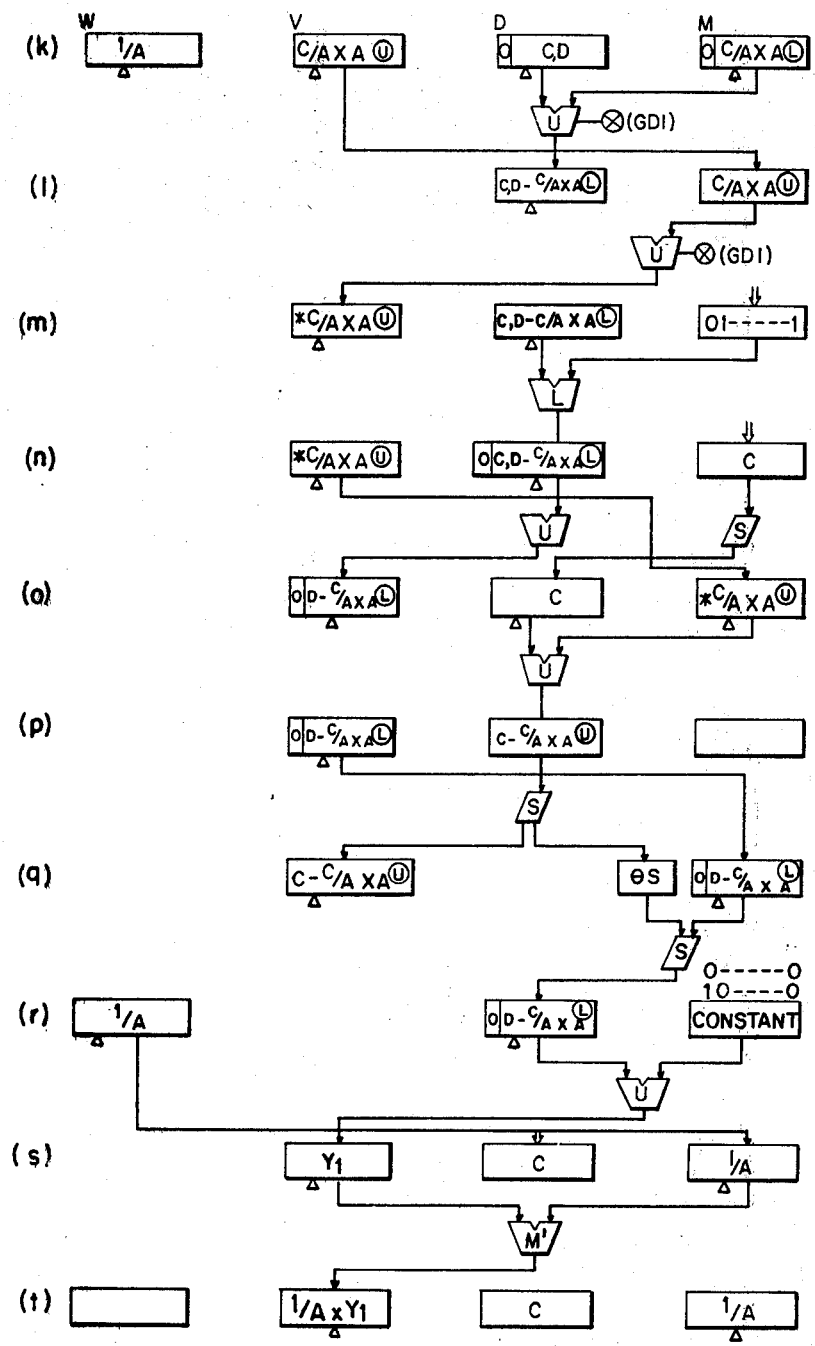
Figure 4C:
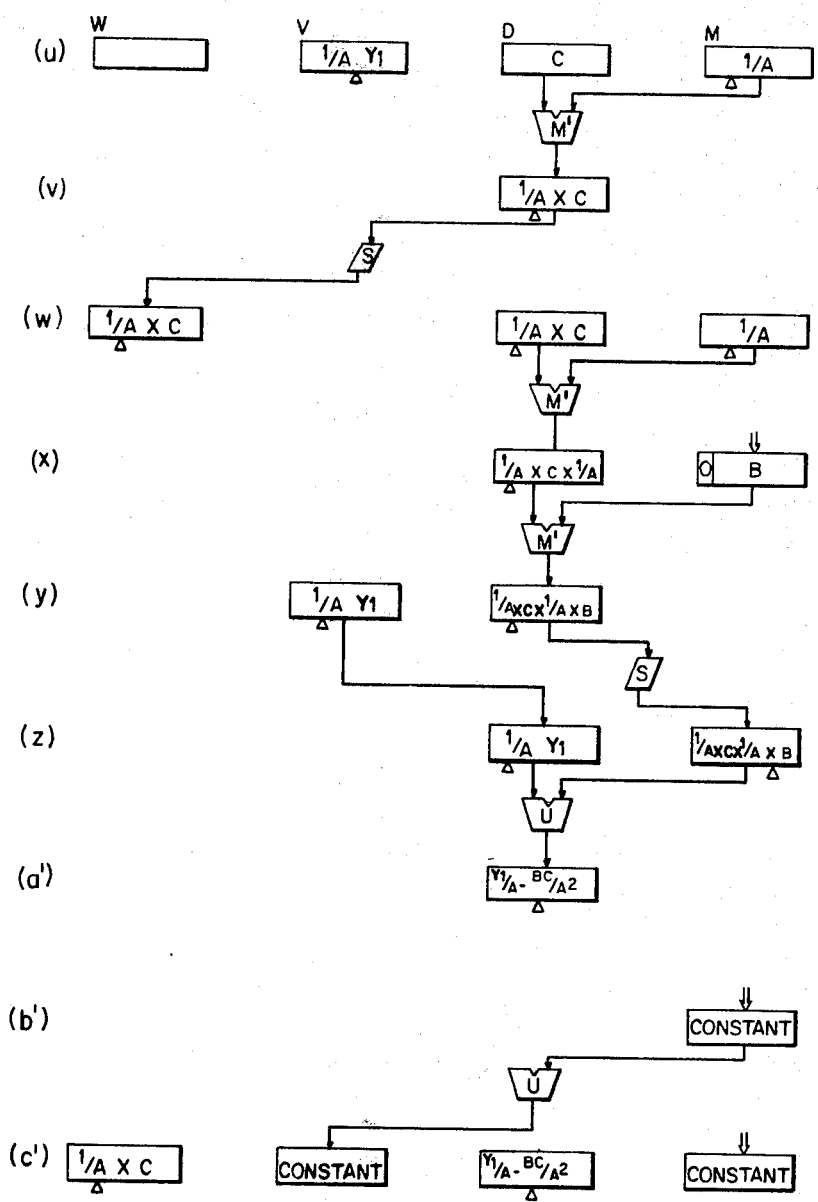
Figure 4D:
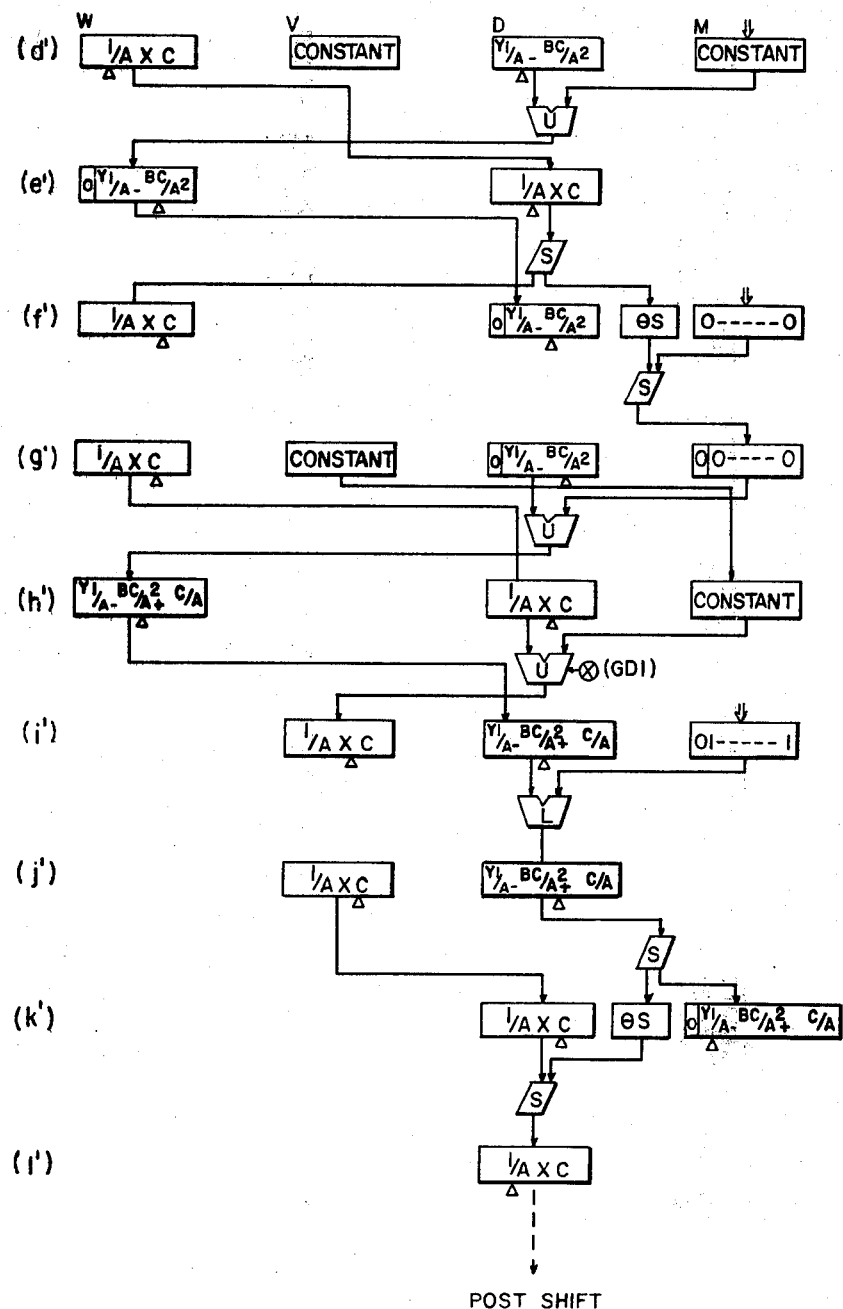

(6) In steps (k) and (l) of FIG. 4B, the contents of register M—$C/A \times A(L)$, including the error due to the result of above operations—are substracted from the contents C, D of register D. The result $D' = C,D - C/A \times A(L)$ is set in register D (step 4(l)). This step provides for the transfer of the error of $C/A \times A(L)$ into the dividend D, yielding D'. At the same time, during steps (k) and (l), the contents $(C/A \times A(U))$ of register V are transferred to register M.

(7) In step (m) of FIG. 4B, the contents of the M register—$C/A \times A(U)$—are converted, in adder U, to 2's complement form, and transferred in that form to the V register, as represented by the designation $*C/A \times A(U)$. This 2's complement operation can, of course, as is known to those of skill in the art, be accomplished by performing a 1's complement operation (merely inverting each binary digit of the value, or equivalently adding the subject value, in each bit position, to a value made up of all 1's), and then by adding 1 to the least significant bit of the result. In addition, during step (m), a constant value (having 1's in each bit position except for the first position) is set in the M register. Finally, during step (m), the value $C,D - C/A \times A(L)$ is maintained in the D register.

(8) During step (n), the logic operation unit L receives the values $C,D - C/A \times A(L)$ and the constant 01 ... 1 from the D and M registers, respectively, and performs a normalization operation to produce results (O/D−C/A×A(L)), which results are stored in the D register. This step is performed for the purpose of checking whether or not the contents of the D register are normalized.

(9) During step (o), the quantity (O/D−C/A×A(L)) is transferred from the D register, via adder U, to the V register; the complemented value *C/A×A(U) is transferred from the V register to the M register; and the value C, stored in the M register, is transferred through shifter circuit S, which shifts the constant value two bits to the right for the purpose of decimal point matching, to the D register.

(10) In step (p), the operation result C/A×A(U)—obtained (with error) in step (h)—is subtracted, in adder U, from the the value C (stored in the D register during step (o)), and the resulting difference is set in the D register. Moreover, during step (q), the difference value, C−C/A×A(U) is provided to shift circuit S, wherein the aforementioned value is shifted five bit places to the right, the shifted value being provided to the V register, while the original five rightmost bits (shifted out of shift circuit S) are provided to the θS register. It is to be noted that, with respect to the error value C−C/A×A(U) derived and stored in the D register during step (p), the significant figures of the error value are contained within the lower five bits. It is, therefore, a purpose of the shifting operation performed by shift circuit S during steps (p) and (q) to "split out" the five bits by shifting, the five bits being saved in the θS register. Finally, during steps (p) and (q), the value (O/D−C/A×A(L)) is transferred from the V register to the M register.

(11) The drop-out (five bits) due to the shift operation in shift circuit S (steps (p) and (q)), picked up in register θS (step (q)), is combined in shift circuit S, during steps (q) and (r), with the value (O/D−C/A×A(L)) (including the said error) from register M. That is to say, the value stored in the M register is provided to shift circuit S, wherein it is shifted five bits to the right. The five most significant bit positions, thus vacated, are then occupied by the five-bit contents of the θS register. Thus, a combination of the contents of the θS register and the M register is obtained, this combined value being provided, during step (r), to the D register. Finally, during step (r), a constant value is stored in the M register, which value is to be utilized during step (s) for the purpose of sign correction, as will now be explained.

(12) During step (s), the value stored in the D register is provided to adder U, the other input of which receives the aforementioned constant stored in the M register. As a result of the operation of adder U, the contents of the D register are corrected for sign, and the result is set in the register V (step (s)) as the new dividend $D''=D-C/A\times A=Y_1$, to which all error has been transferred. During step (s), the value 1/A, previously stored in the W register, is transferred to the M register, and a value C is maintained in the D register.

(13) In steps (s) and (t), the contents $Y_1$ of register V (step (s)) are multiplied, in multiplier M', by the value 1/A from the M register, and the result $1/A \times Y_1$ is set in the register V (during step (t)). It is to be noted that this product has the decimal point offset nine bits to the right due to the fact that the one multiplier $Y_1$ has a seven-bit offset while the 1/A multiplier has a two-bit offset. In addition, it is to be noted that the contents of the V register express the value which is obtained by dividing the dividend D'', into which the error included in the C/A operation of step (f) had been transferred, by the divisor A.

(14) In steps (u) and (v) (FIG. 4C), the dividend C is divided by the divisor A by means of multiplying value C (in the D register) by the value 1/A (in the M register) utilizing the multiplier M', the resulting product being stored initially, during step (v), in the D register. However, during step (w), the value 1/A×C, stored in the D register, is saved in the W register, being provided thereto by shift circuit S.

(15) During steps (x) and (y) (FIG. 4C), the operation $BC/A^2$ is computed by successive multiplications, in multiplier M', of the values 1/A×C in the D register, 1/A in the M register, and B in the M register. The resulting product is provided, via shift circuit S, to the M register during step (z). In addition, during that step, the value $1/A \times Y_1$—previously stored in the V register—is provided to the D register. It is to be recognized that the $1/A \times Y_1$, stored in the D register, has a nine-bit offset, while the 1/A×C×1/A×B value, stored in the M register, has a four-bit offset (due to the fact that it is the product of double multiplication by 1/A, the latter having a two-bit offset). Accordingly, during the transfer operation from the D register to the M register, via shift circuit S, the value 1/A×C×1/A×B is shifted five bits to the right for the purpose of decimal point matching.

(16) During step (a'), the difference between the respective values stored in the D and M registers is obtained by subtraction in adder U, with the result $Y_1/A - B - C/A^2$ being stored in the D register.

(17) During steps (b'), (c') and (d'), respective constant values are stored in the V and M registers, while the values 1/A×C and $Y_1/A - BC/A^2$ remain stored in the W and D registers, respectively.

(18) During step (e'), the value 1/A×C is transferred from the W register to the D register, while a constant stored in the M register is subtracted, in adder U, from the value stored in the D register, with the resulting difference being provided to the W register as value $(O/Y_1/A - BC/A^2)$. The purpose of this step is to force the first bit of the value stored in register D during step (d') to "0." The value stored in the D register during step (d') must have its first bit forced to "0" because it (the value stored in the D register) corresponds to the lower N bits of the 2N-bit quotient to be obtained at the end of processing.

(19) During step (f'), the value 1/A×C stored in the D register is provided to shift circuit S, wherein it is shifted seven bits to the right for the purpose of offset-matching the decimal points, and the shifted value is provided as new value 1/A×C to the W register, with the drop-out due to shift (seven significant bits) being picked up by the θS register. Also, during step (f'), the value stored in the W register during step (e') is transferred to the D register, while the M register is loaded with all zeros. It is to be noted that the shift circuit S, during step (f') must shift by seven bits because the value $(O/Y_1/A - BC/A_2)$ stored in the W register during step (e') and in the D register during step (f') has a nine-bit offset, while the value 1/A×C stored in the D register during step (e') has only a two-bit offset. It is to be also noted that the upper bits of 1/A×C are stored in the W register, after shifting, with the sign bit expanded.

(20) During step (g'), the values stored in the W and D registers are maintained, as is the constant value stored in the V register, while the contents of the θS register (the lowermost seven bits of 1/A×C after shifting out) are combined, in shift circuit S, with the "all 0" contents of the M register, resulting in a double-length version of the θS register contents being stored in the M register, with all zeros in all bit positions except for the most significant seven (excluding the sign bit).

(21) During step (h'), the value 1/A×C is transferred from the W register to the D register, the constant value stored in the V register is transferred to the M register, and the contents of the D and M registers, respectively, are provided to the adder U, whereby the lower seven bits of 1/A×C—as stored in the most significant positions of the M register—are added to the contents $(O/Y_1/A - BC/A^2)$ of the D register, the result $(Y_1/A - BC/A^2 + C/A)$ being stored in the W register. It is to be noted that, whereas the lowermost seven bits of C/A, previously shifted out of the D register, through the θS register in step (f') and ultimately to the M register during step (g'), are added to the contents of the D register during step (h'), the uppermost bits of C/A are transferred from the W register to the D register during step (h').

(22) Steps (i') through (l') are performed merely for the purpose of checking sign bits and achieving normalization of the resulting values. Thus, in step (i'), the value 1/A×C is added to a constant, in adder U, and the result is stored in the V register; concurrently, the value stored in the W register is transferred to the D register, and a constant (01 . . . 1) is stored in the M register. During step (j'), the contents of the D register and the constant (01 . . . 1) are applied to the logic operation unit L—as was the case during steps (m) and (n) of FIG. 4B discussed above—so as to achieve 2's complement conversion of the contents of the D register, the 2's complement result being stored in the D register. During step (k'), the 1/A×C value stored in the V register is transferred to the D register, while the $Y_1/A - BC/A^2 + C/A$ value stored in the D register is provided, via shift circuit S, to the M register in shifted form, with the drop-out due to shift being saved in the θS register. Subsequently, during step (l'), the contents (1/A×C) of the D register and the contents of the θS register are combined in shifter S so as to achieve a final value of 1/A×C which is stored in the D register. Thus, the process of checking of sign bits and normalization is completed.

As a further illustration of the method and system of the present invention, the following numerical examples should be considered. Consider the division processing represented by equation (1) wherein the parameters A, B, C and D have the following values:

$A = (400\text{-------}0)_8$
$B = (100\text{-------}0)_8$
$C = (300\text{-------}0)_8$
$D = (200\text{-------}0)_8$ $( )_8$ means octal notation, i.e., $(30 \text{ - - - } 0)_8$ is equal to $(011\ 000 \text{ - - - } 000)_2$ expressed in binary notation. Accordingly, each digit corresponds to three bits of binary notation, the first (leftmost) bit of the binary notation being a sign bit, followed by a decimal point placed between the first bit and the second bit. Then, $A = (40\text{-----}0)_8 = (1.00\ 000\text{-----}000)_2 = (-1.0)_{10}$
$B = (10\text{-----}0)_8 = (0.01\ 000\text{-----}000)_2 = (+0.25)_{10}$
$C = (30\text{-----}0)_8 = (0.11\ 000\text{-----}000)_2 = (+0.75)_{10}$
$D = (20\text{-----}0)_8 = (0.10\ 000\text{-----}000)_2 = (+0.50)_{10}$ In the above, ( - - - ) indicates identical consecutive digits or bits.

Following is an explanation of each step (a) - - - (l') corresponding to FIGS. 4A-4D, but with reference to further FIGS. 5A-5D.

Steps (a) and (b): These two steps are, as previously explained, merely operational check steps; further explanation is omitted.

Step (c): $A = (40 \text{ - - - } 0)_8$ is fed into both the D register and M register, and $(377 \text{ - - - } 7)_8$—which is equivalent to $(+1.00)_{10}$—is set in the V register. More specifically, $(37 \text{ - - - } 7)_8$ is equal to $(0.11\ 111 \text{ - - - } 111)_2$, and comprises a small amount of error. Then 1/A is calculated in the manner shown in, and explained with reference to, FIG. 3.

Step (d): The result $1/A = (67 \text{ - - - } 75)_8$ is obtained from divider D, and is set in both the W register and the D register. The result of such a division operation is always (automatically) shifted 2 bits to the right. The reason is as follows. The significant figures of the dividend and divisor both appear from the second bits of each form in binary notation. This means that the value of each of them is greater than ½ and less than 1. But, in some cases, the result of the division may be greater than 1. For example, if the dividend is close to 1, and the divisor is close to ½, the result (quotient) will be close to 2. On the other hand, the number, the absolute value of which is greater than or equal to 1, cannot be expressed in binary floating point notation system. Therefore, it is required to shift the quotient, and force it to be less than 1. The value of the quotient 1/A may be proven as follows. As mentioned before, $A = (-1)_{10}$; thus 1/A is also $(-1)_{10}$. On the other hand, the quotient $(67 \text{ - - - } 75)_8$ is a negative value. If it is converted into a positive value, it becomes $(67\text{---}75)_8 = (1.10\ 111\text{--------}111\ 101)_2$
$\rightarrow (1.10\ 111\text{--------}111\ 100)_2$
$(0.01\ 000\text{--------}000\ 011)_2$ and this is very close to ¼. As mentioned previously, the quotient is shifted 2 bits to the right, the equivalent of multiplication by ¼. Then, $(67 \text{ - - - } 75)_8$ is the value $(-1)_{10}$ shifted to the right for two bits. It should be noted that the symbol ⇒ designates the operation of subtracting 1 from the last rightmost bit, and the symbol ‾ designates the operation of inverting (1's complementing) each bit. In this step, $C = (30 \text{ - - - } 0)_8$ is set in the M register.

Step (e): The product of 1/A set in the D register and C set in the M register is obtained in the D register as value $(717 \text{ - - - } 75)_8$. This value may be proven as follows.

$1/A = (67\text{-------}75)_8 = (1.10\ 111\text{ -------- } 111\ 101)_2$
$C = (30\text{-------}00)_8 = (0.11\ 000\text{ -------- } 000\ 000)_2$ Thus, $(1/A)*C = (1/A)*(0.1)_2 + (1/A)*(0.01)_2$ where * indicates × or multiplication.

$(1/A) * (0.1)_2 = 1.11\ 011\text{ ---------- } 111\ 101$
$(1/A) * (0.01)_2 = 1.11\ 101\text{ ---------- } 111\ 1101$ Adding them, we obtain $$11.11\underbrace{001\;1}\underbrace{\text{---------}}\underbrace{1\;11}\;\underbrace{1\;0}\underbrace{111}$$
$$= (\;7\quad 1\quad 7\text{----}7\;5\;)_8$$

Step (f): The value C/A is moved into V register, and A is set in M register.

Step (g): The (C/A) value is multiplied by A in an iterative operation in multiplier M'. The upper N bits of the product are provided to the M register.

Step (h): To the upper N bits are added (in adder U) the carry from the lower N bits, and the upper N bits are moved from the M register to the V register. The lower N bits of the product are provided to the D register. The fact that the values $(060\text{ - - - }03)_8$ and $(00\text{ - - - }0)_8$ obtained in the V and D registers, respectively, are equal to $(C/A)*A.(C')$ can be proven as follows. $(C/A)*A$ should be $-(C/A)$, because A is $(-1)_{10}$. So here we try to obtain the $-(C/A)$.

$$(C/A) = (717\text{-----}75)_8$$
$$= (1.11\;001\;111\text{ --- }111\;101)_2$$
Thus:
$$-(C/A) = (0.00\;110\;000\text{ -----}000\;010)_2$$

Adding "1" to the least significant bit gives:

$$-(C/A) = (0.00\;110\;000\text{ -----}000\;011)_2$$
$$= 60\quad 6\quad 0\text{-----}0\quad 3\;)_8$$

The last digit $(3)_8$ and the contents of D register (which is zero accidentally in this case) are the errors on which the present invention is focussed. The value C is set in M register.

Step (i): Steps (i) thru (s) comprise the operation of combining the errors (accurately speaking, the errors within C/A multiplied by A) to the value D.

First, in step (i), C and D are shifted to the right by 2 bits, since the obtained value (C/A) was shifted as mentioned in step (d) above. The 2 lower bits shifted out of the right-shifted value C are saved in the $\theta$S register, and are then provided to the shifter S to be combined with D.

Steps (j) and (k): The output from the shifter S is set in D register, in accordance with the following explanation. $D = (20\text{ - - - }0)_8 = (0.10\;000\text{ - - - }000)_2$; when shifted, $D = (0.00\;100\text{ - - - }000)_2$. At the second and third bit positions of this value, the two bits saved in the $\theta$S register are inserted, and the value then becomes $(0.00\;1\;00\text{ - - - }000)_2$. In this case, the shifted out value is accidentally $(00)_2$, and the insertion results in no change to D. The result is expressed in octal notation as $(040\text{ - - - }0)_8$, and corresponds to (C, D) in step (k) of FIG. 4B and D' in step (k) of FIG. 5B. The lower 2 bits of D are also shifted out when it is shifted, but they are not saved.

Step (l): The difference between the content of the D register in step (k) (from here on, we call it "rectified D") and the lower N bits of (C/A)*A—which is a part of said errors—is set in the D register as D". In this case, since the content of the M register is accidentally zero, the difference is the same as "rectified D." The content of the V register is transferred to the M register.

Step (m): The content of the M register—which is the upper bits of (C/A)*A—is converted to the 2's complement form, and provided to the V register. The process of this conversion is shown as follows:

$$(C/A) * A(U) = (060\text{ ------ }03)_8$$
$$= (0.00\;110\;000\text{ ---- }000\;011)_2$$
$$\Rightarrow (1.11\;001\;000\text{ ---- }111\;100)_2$$

With "1" add to the last position:

$$(C/A) * A(U) = (1.11\;001\;111\text{ ---- }111\;101)_2$$
$$= (7\;1\;7\text{ ------- }7\;5\;)_8$$

Then, a constant value $(37\text{ - - - }7)_8$ is set in the M register.

Step (n): This step is for checking whether or not the content of the D register is normalized.

Step (o): The "rectified D" is transferred to the V register, and the value C (set in the M register in step (n)) is shifted 2 bits to the right for the purpose of matching decimal points. The complement of $(C/A)*A(U)$ is transferred to the M register.

Step (p): The difference between $(C/A)*A(U)$—which includes some error—and the original value C are set in the D register. The process of this subtraction is shown as follows:

Shifted $C = (060\text{----}0)_8 = (0.00\;110\;000\text{ --- }-00\;000)_2$
$(C/A) * A(U) = (717\text{---}75)_8 = (1.11\;001\;111\text{ --- }111\;101)_2$ Adding the two gives:

$$(1.11111111\text{ - - - }111101)_2 = (777\text{ - - - }75)_8$$

Step (q): The significant figures of the error of C, obtained in step (p), are within the lower 5 bits of the D register. To pick up these significant figures, the contents of the D register are shifted 5 bits to the right, and the 5 bits shifted out are saved in the $\theta$S register. It should be noted that, in FIG. 5B, step (q) of the drawings, the quantity "75" is indicated for simplification; but the quantity is in fact (11 101). During step (q), the contents of the V register are moved into the M register.

Figure 5A:
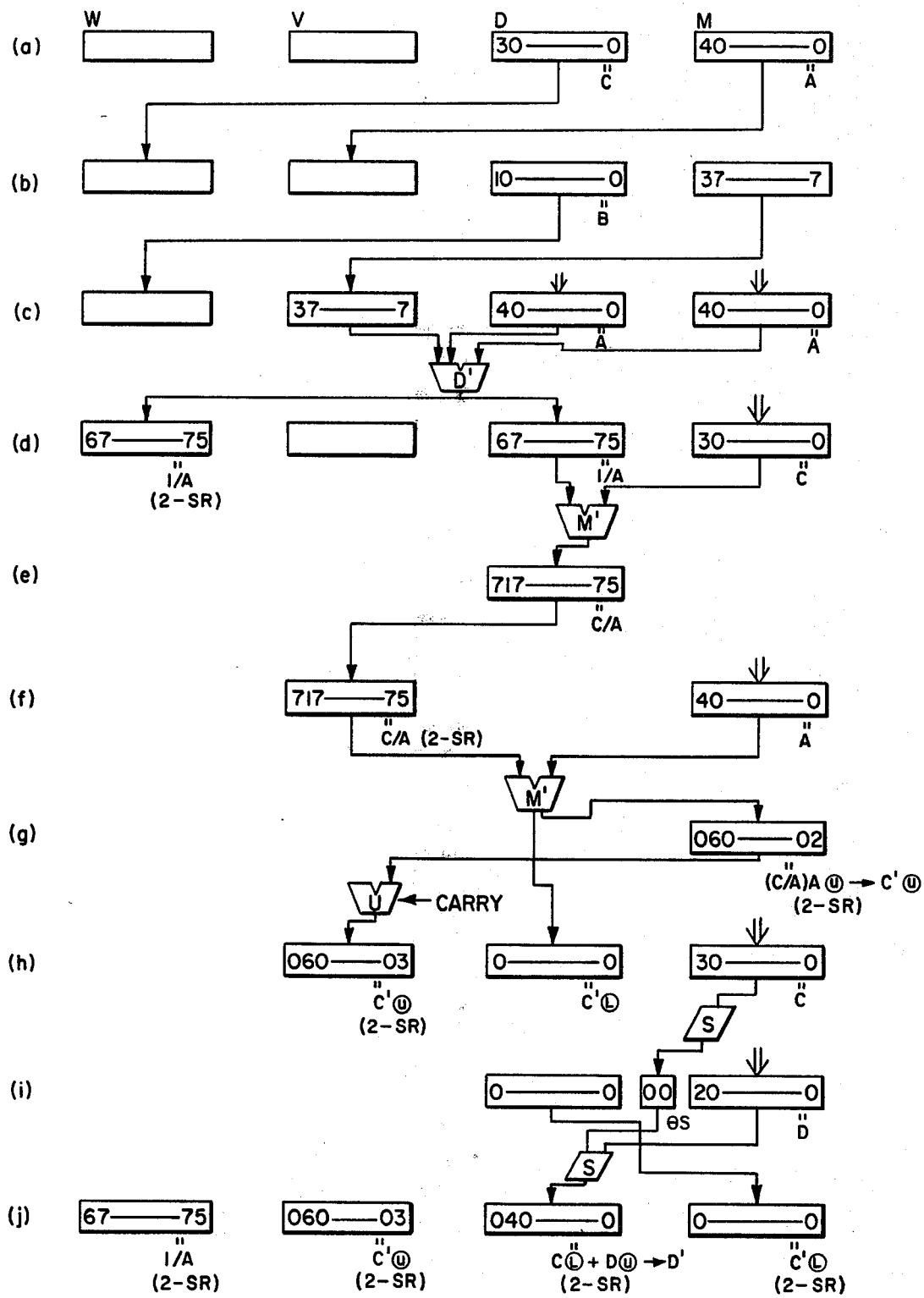
FIGS. 5A, 5B, 5C and 5D depict, by reference to a specific numerical example, the contents of various registers and the operations performed with respect thereto during various steps (a) thru (1') of the inventive system and method.
Figure 5B:
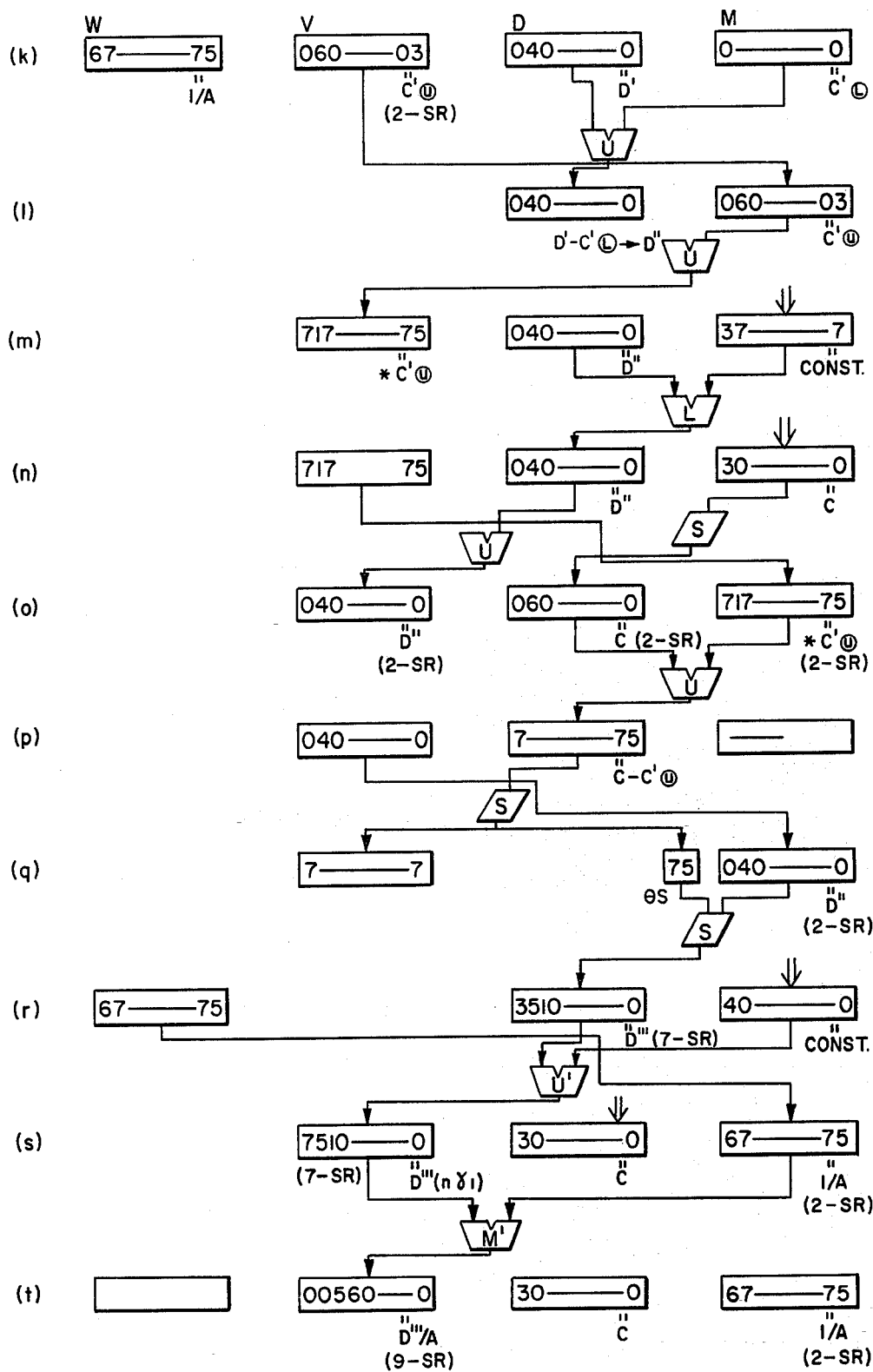
Figure 5C:
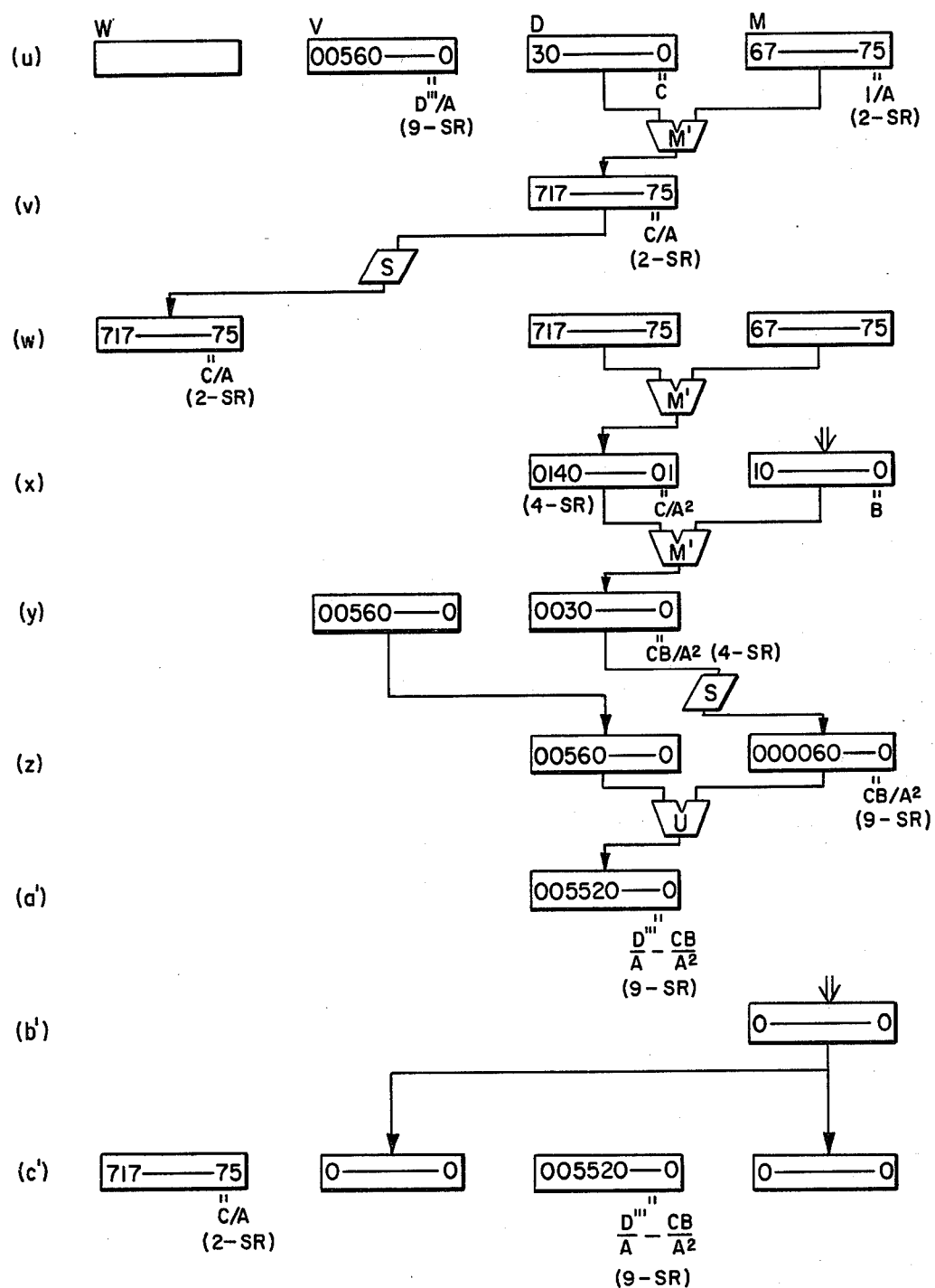
Figure 5D:
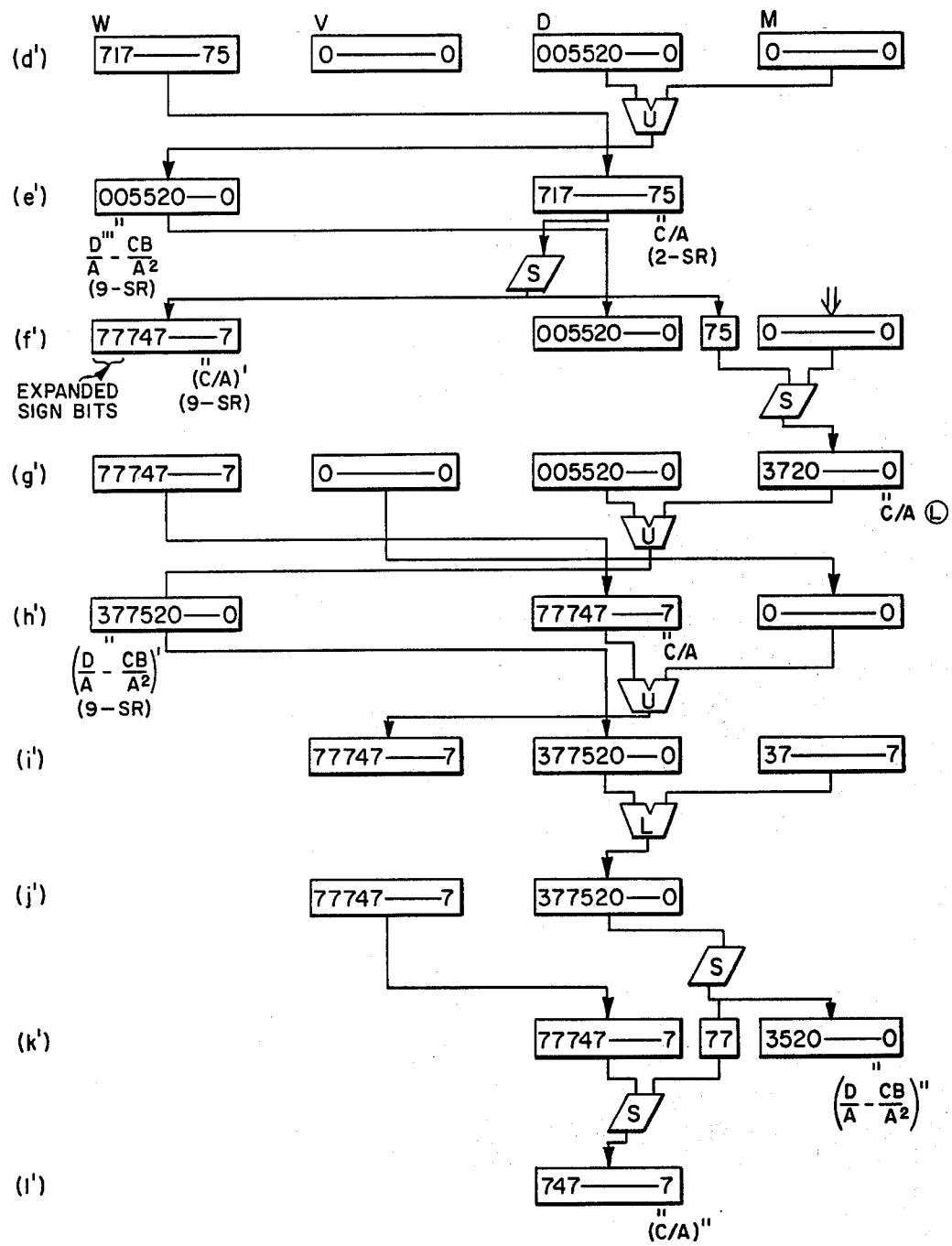

Step (r): In this step, the 5 bits saved in the $\theta$S register are combined, in shift circuit S, with the contents of the M register. The process is as follows: The contents of the M register $(040\text{ - - - }0)_8 = (0.00\;100\;0\text{ - - - }000)_2$ are shifted 5 bits to the right, and the register contents become $(0.00\;000\;001\;0\text{ - - - }000)_2$. During shifting, the value $(75)_8 = (11101)_2$ is inserted into bit positions 2 thru 6, and the value becomes $$(0.1110100100\text{ - - - }000)_2 = (3510\text{ - - - }0)_8$$

which is value D''' in FIG. 5B, step (s).

Step (s): In this step, the contents of the D register—derived during which was further rectified in step (q)—are added to the value $(40\text{ - - - }0)_8 = (10000\text{ - - - }0)_2$ set in the M register so as to correct the sign bit of D'''. The result is set in the V register, and this result has the decimal point offset by 7 bits to the right in comparison with the original value of D.

The meaning of steps (p) thru (s) is now further explained. The content of the D register in step (p), $(77\text{ - - }75)_8$, is the difference between the original value of C and the value (C/A)*A. This is a negative value because the first bit is "1". This value is combined, during steps (q) and (r), with the value of D", as follows:

```
     (1.11 111 -------- 111 101)₂
     (0.00 ---------------- 00)
            (0.00 100 0-------- 000)₂
+   ─────────────────────────────────
    (1.11 ------------ 111 101 00 100 0-------- 000)₂
           (1.11 101 001 000 ---- 000)₂
         = ( 7 5 1 0 ------ 0 )₈
``` and $(7510 - - - 0)_8$ is the correct result. But the shift operation in steps (p) thru (r) leaves the sign bit "0" in the M register, and causes the result to be $(35100 - - - 0)_8$. Therefore, sign bit correction is required in step (s). Now, if the contents of the D register is step (r) are positive, the value $(00 - - - 0)_8$—instead of $(40 - - - 0)_8$—should be set in the M register during step (r).

Steps (t) and (u): The value D''', which was derived during step (s), is multiplied, during step (t), by 1/A which was moved into the M register during step (s). The resulting product has the decimal point offset by 9 bits to the right because the value D''' has a 7-bit offset, and the 1/A value has a 2-bit offset. The value of the product may be verified. Both $(7510 - - - 0)_8$ and $(67 - - - 75)_8$ are negative; therefore, they are converted into positive forms, and the products then formed, as follows:

```
(7510-----0)₈ = (1.11 101 001 000 --- 000)₂
             → (1.11 101 000 111 --- 111)₂
               (0.00 010 111 000 --- 000)₂ --- value * 1
(677-----75)₈ = (1.10 111 111 --- 111 101)₂
             → (1.10 111 111 --- 111 100)₂
               (0.01 000 000 --- 000 011)₂ --- value * 2
(value * 1) * (value * 2) =
(0.00 000 101 110 000 --- 000)₂ =
( 0 0 5 6 0 0 --- 0 )₈
```

Step (v): The product of the value C set in the D register in step (s) and the value 1/A set in the M register is formed and set in the D register. The value of this product may be verified as follows:

```
M register = (67----75)₈ = (1.10 111 --- 101)₂
D register = (30----00)₈ = (0.11 000 --- 000)₂
```

Then, the product is formed:

```
    1.11 011 111 ------ 111 110(1)
    1.11 101 111 ------ 111 111(01)
   ───────────────────────────────
   11.11 001 111 ------ 111 101(11)
 = ( 1.11 001 111 ------ 111 101)₂
 = ( 7 1 7 ----- 7 5 )₈
```

Step (w): The above product (C/A) is saved in the W register.

Step (x): The C/A value left in the D register is multiplied by 1/A left in the M register, and the product is set in the D register. This product may be verified as follows:

```
(717---75)₈ = (1.11 001 111 --- 111 101)₂
           → (1.11 001 111 --- 111 100)₂
           ⇒ (0.00 110 000 --- 000 011)₂ --- value * 3
(677---75)₈ = (1.10 111 111 --- 111 101)₂
           → (1.10 111 111 --- 111 100)₂
           ⇒ (0.01 000 000 --- 000 011)₂ --- value * 4
(value * 3) * (value * 4) =
(0.00 001 100 000 --- 000 001)₂ =
( 0 1 4 0 --- 0 1 )₈
```

Step (b'), (c') and (d'): These steps are omitted because they pertain to normalization and checking functions not critical to the present invention.

Step (e'): The first bit of $(D/A)-(BC/A^2)$ is forced to "0". This value corresponds to the lower N bits of the 2 N-bit quotient to be obtained at the end of the process. The lower N bits must, therefore, have "0" in the most significant bit position thereof.

Step (f'): The C/A value in the D register is shifted 7 bits to the right for the purpose of matching the offset of the decimal points. The shift amount is 7 bits because the value $(D/A)-(BC/A^2)$ has a 9-bit offset while the C/A value has only a 2-bit offset. The shifted out lower 7 bits of C/A are saved in the $\theta S$ register, and the upper bits are set in the W register with the sign bit expanded. The value $(D/A)-(BC/A^2)$ is moved into the D register.

Step (g'): The lower 7 bits of C/A—$(1111101)_2$— are fed into the M register, and the value $(0.11\ 111\ 010\ 000 - - - 000)_2$, i.e., $(3720 - - - 0)_8$, is obtained.

Step (h'): The lower 7 bits of C/A are added to $(D/A)-(CB/A^2)$, and the sum is set in the W register. The upper bits of C/A are moved into the D register.

Step (i') AND (l'): These steps are omitted because they are merely for the purpose of checking of sign bits and normalization.

As explained above, by using the present invention, the division of data with 2 N bit precision, for example, the processing of $$\frac{C + D \times 2^{-70}}{A + B \times 2^{-70}}$$

is made possible by division processing of N bit precision data in the form of $$C/A + (D/A - BC/A^2) \times 2^{-70}$$

Moreover, as shown in FIGS. 4A—D and 5A—D, division with 2 N bit precision can be realized using N-bit precision registers W, V, D and M merely by properly performing the contriol of data transfer between each register.

To summarize, the inventive method and system for performing division processing with 2 N-bit precision utilizing only N-bit precision components involves the following procedures:

(a) The upper N bits of the quotient are approximated—during steps (a) thru (e)—by virtue of the calculation, by means of N-bit precision division processing, of a quotient $Q_1 = C/A$. This quotient $Q_1$ necessarily includes an error value.

(b) The $Q_1$ quotient (C/A) is processed, during steps (f) thru (k), to derive a rectified D—designated D'—which represents the value of D when the error value of C/A is transferred thereto. More specifically, during steps (f) thru (h), the value C/A is processed with the value A, and a value C'—with the error value removed—is derived. Then, during steps (i) thru (k), further processing takes place in accordance therewith so as to derive the new value of D, designated D', which includes the error value transferred thereto.

(c) The latter procedure of paragraph (b) is repeated, during steps (l) thru (n), so as to derive a further rectified D—designated D''.

(d) During steps (o) thru (r), an even further rectified value of D—designated D'''—is derived.

(e) In the preferred embodiment, during steps (s) and (t), the value D''' is utilized to calculate a quotient D'''/A, while during steps (u) thru (z), a value BC/A² is also derived. Then, during step (a'), the difference term D'''/A−BC/A² is calculated. It should be noted that, whereas the preferred embodiment calls for the derivation of the term D'''/A−BC/A², one of ordinary skill in the art—having read this specification—could easily modify the system and method of the present invention so as to derive a term B''' (rather than D'''), and then utilize this term to calculate the difference value D/A−B'''C/A². In the first case—that of the preferred embodiment—the error value contained in the quotient C/A ($Q_1$) is transferred to the value D (yielding D'''), while in the modified case the error value contained in C/A is transferred to the value B (yielding the new value B''').

(f) During steps (b') thru (l'), a rectified binary quotient (C/A)'' or $Q_1$'' is derived from the original binary quotient C/A ($Q_1$) and the previously calculated difference value D'''/A−BC/A² (or, in the modified case, D/A−B'''C/A²)—referred to also as the approximation of the quotient $Q_2$—in accordance with N-bit precision division processing.

It will be apparent that many modifications and variations may be effected without departing from the scope of novel concepts of this invention. Therefore, it is intended by the appended claims to cover the true spirit and scope of the invention.

We claim:

1. A method for performing division processing with 2 N-bit precision utilizing only N-bit precision components which perform at least multiplication processing and division processing, wherein the division function to be performed with 2 N-bit precision is expressed as:

$$\frac{C + D \times 2^{-n}}{A + B \times 2^{-n}}$$

(n=N, the number of digit positions in each of the selected binary numbers A, B, C and D) and wherein the answer to said division function is represented by:

$$Q_1 + Q_2 \times 2^{-n}$$

where $Q_1$ and $Q_2$ are binary quotients each of N bits; the method comprising the steps of:
approximating said binary quotient $Q_1$, in accordance with division processing of N-bit precision, to produce a $Q_1$ approximation which includes an error value;
operating on said $Q_1$ approximation in accordance with said N-bit precision division processing and in conjunction with said A, B, C and D terms so as to calculate an approximation of said quotient $Q_2$; and
generating said binary quotient $Q_1$, from said $Q_1$ approximation in conjunction with said A and C terms, in accordance with N-bit precision division processing.

2. A method as recited in claim 1, further comprising the step of
calculating said $Q_2$ quotient based on the value of at least the term D,
and wherein said operating step comprises extracting the error value from said $Q_1$ approximation, and transferring said extracted error value to the term D in said $Q_2$ quotient, whereby said approximation of said quotient $Q_2$ is calculated.

3. A method as recited in claim 1, further comprising the step of
calculating said $Q_2$ quotient based on the value of at last the term B,
and wherein said operating step comprises extracting the error value from said $Q_1$ approximation, and transferring said extracted error value to the term B in said $Q_2$ quotient, whereby said approximation of said quotient $Q_2$ is calculated.

4. A method for performing division processing with 2 N-bit precision utilizing only N-bit precision components which perform at least multiplication processing and division processing, wherein the division function to be performed with 2 N-bit precision is expressed as:

$$\frac{C + D \times 2^{-n}}{A + B \times 2^{-n}}$$

(n=N, the number of digit position in each of the selected binary numbers A, B, C and D) and wherein the answer to said division function is represented by:

$$Q_1 + Q_2 \times 2^{-n}$$

where $Q_1$ and $Q_2$ are binary quotients each of N bits; the method comprising the steps of:
calculating binary quotient C/A, in accordance with division processing of N-bit precision, to produce a $Q_1$ approximation which includes an error value;
operating on said C/A quotient in accordance with said N-bit precision division processing and in accordance with said A, B, C and D terms so as to calculate an approximation of said quotient $Q_2$; and
generating said binary quotient $Q_1$ from said binary quotient C/A in conjunction with said A and C terms in accordance with N-bit precision division processing.

5. A method as recited in claim 4 utilizing a decoder circuit and an adder, wherein said step of calculating C/A includes:
decoding the value A to define a value $R_0$ such that the product $A \times R_0$ approaches a value of 1,
determining a first error value as the error of $A \times R_0$ relative to said value of 1,
processing the said first error value to derive a further term $R_1$ where the product $A \times R_0 \times R_1$ more closely approaches the value of 1,
deriving a further error value as the error of $A \times R_0 \times R_1$ relative to said value of 1,
deriving successively, such further error values to define a product $A \times R_0 \times R_1 \times R_2 \ldots$ approaching the value of 1 to a desired degree, and
performing the multiplication $C \times R_0 \times R_1 \times R_2 \ldots$ to produce the quotient C/A; and
wherein the method includes the additional step of storing the quotient result of the operation C/A; and
wherein said operating step comprises:
extracting said error value from the C/A quotient by performing $C - A \times (C/A)$ to produce said error value included in C/A,
transferring said error value to the term D to define a term D'', performing the multiplication $D'' \times R_0 \times R_1 \times R_2 \ldots$, determining the value $BC/A^2$, and performing the operations $(D''/A) - (BC/A^2)$, whereby to derive said approximation of said quotient $Q_2$.

6. A method as recited in claim 4, wherein said operating step comprises:

extracting said error value from the C/A quotient, and transferring the error value to the term B to produce a term $B''$, performing the operation $B''C/A^2$, storing the resultant value of the operation $B''C/A^2$, determining the value $D/A$, and performing subtraction to produce $(D/A) - (B''C/A^2)$.

7. A method as recited in claim 4, wherein said operating step comprises:

extracting said error value from the C/A quotient, and transferring the error value to the term D to produce a term $D''$, performing the operation $BC/A^2$, storing the resultant value of the operation $BC/A^2$, determining the value $D''/A$, and performing subtraction to produce $(D''/A) - (BC/A^2)$.

8. A system for performing division processing with 2 N-bit precision, wherein the division function to be performed with 2 N-bit precision is expressed as:

$$\frac{C + D \times 2^{-n}}{A + B \times 2^{-n}}$$

(n=N, the number of digit positions in each of the selected binary numbers A, B, C and D) and wherein the answer to said division function is represented by $Q_1 + Q_2 \times 2^{-n}$, where $Q_1$ and $Q_2$ are each N-bit binary quotients said system comprising:

means for division processing at least two of said selected binary numbers, in accordance with division processing of N bit precision, to produce a $Q_1$ approximation;

means for receiving said $Q_1$ approximation from said division processing means and for calculating an error value relating said $Q_1$ approximation to said $Q_1$ quotient;

means for storing said $Q_1$ approximation from said division processing means and said error value from said error value calculating means;

additional means for processing said selected binary numbers in accordance with said error value from said error value calculating means, and in accordance with division processing of N-bit precision, to produce an approximation of said $Q_2$ quotient; and further means for generating said binary quotient $Q_1$ from said $Q_1$ approximation in conjunction with said A and C terms.

9. A system as recited in claim 8, wherein said $Q_1$ approximation $= C/A$ and said $Q_2$ approximation $= (D'/A) - (BC/A^2)$; and said additional means for division processing comprises means for transferring said error value to D so as to define said term $D''$.

10. A system as recited in claim 8, wherein said $Q_1$ approximation $= C/A$ and said $Q_2$ approximation $= (D/A) - (B''C/A^2)$; and said additional means for division processing comprises means for transferring said error value to B so as to define the term $B''$.

11. A system as recited in claim 8, wherein said $Q_1$ approximation $= C/A$; and said means for division processing to produce said $Q_1$ approximation comprises:

means for decoding the value A to define a value $R_0$ such that the product $A \times R_0$ approaches a value of 1;

means for determining a first error value as the error of $A \times R_0$ with respect to said value of 1;

means for processing said first error value from said first error value determining means to derive a further term $R_1$ where the product $A \times R_0 \times R_1$ more closely approaches the value of 1;

means for determining a further error value as the error of $A \times R_0 \times R_1$ with respect to said value of 1;

means for successively deriving such further error values to define a product $A \times R_0 \times R_1 \times R_2 \ldots$ approaching the value of 1 to a desired degree; and means for performing the multiplication $C \times R_0 \times R_1 \times R_2 \ldots$ to produce the quotient C/A and said error value.

12. A system as recited in claim 11, wherein said additional means for processing said selected binary numbers comprises:

means for transferring said error value to the binary number D, thereby defining a term $D''$;

means for performing the multiplication $D'' \times R_0 \times R_1 \times R_2 \ldots$ to obtain $D''/A$;

means for determining the value $BC/A^2$; and means for performing the operation $D''/A - BC/A^2$ to obtain the approximation of $Q_2$.

13. A system as recited in claim 11, wherein said additional means for processing said selected binary numbers comprises:

means for transferring said error value to the binary number B, thereby defining a term $B''$;

means for performing the multiplication $D \times R_0 \times R_1 \times R_2 \ldots$ to obtain $D/A$;

means for determining the value $B''C/A^2$; and means for performing the operating $D/A - B''C/A^2$ to obtain the approximation of $Q_2$.

* * * * *

UNITED STATES PATENT AND TRADEMARK OFFICE
CERTIFICATE OF CORRECTION

PATENT NO. : 4,272,827
DATED : June 9, 1981
INVENTOR(S) : Inui et al.

It is certified that error appears in the above—identified patent and that said Letters Patent is hereby corrected as shown below:

Front page, [73] Assignee, "Tokyo" should be --Kawasaki--.

Column 2, line 54, "CSA.TRAIN" should be --CSA·TRAIN--;
    "FIGS." should be --FIG.--.

Column 3, line 36, "$\leqq$" should be --$\leq$--.

Column 4, line 11, "5/6" should be --5/6)--;
    line 32, "(CSA.-" should be --(CSA·- --;
    line 47, "shaft" should be --shift--;
    line 60, "(CSA" should be --(CSA·--.

Column 5, lines 4, 10, and 11 (both occurrences),
    "$i^{th}$" should be --$i^{\underline{th}}$ --.

Column 12, line 45, insert --$\Rightarrow$-- before "(0.01";
    line 51, "$\Rightarrow$" should be --$\rightarrow$ --;
    line 53, before "designates" insert --$\Rightarrow$ --.

Column 13, line 30, "=60" should be --=(0--.

Column 14, line 31, "$(1.11111111\text{---}111101)_2=(777\text{---}75)_8$"
    should be --$(1.11\ 111\ 111\text{---}111\ 101)_2$
        $=(777\text{---}75)_8$--;
    line 52, "$(0.1110100100\text{---}000)_2=(3510\text{---}0)_8$"
    should be --$(0.11\ 101\ 001\ 00\text{---}000)_2$
        $=(3\ 5\ 1\ 0\text{---}0)_8$--.

UNITED STATES PATENT AND TRADEMARK OFFICE
CERTIFICATE OF CORRECTION

PATENT NO. : 4,272,827

DATED : June 9, 1981

INVENTOR(S) : Inui et al.

Page 2 of 2

It is certified that error appears in the above—identified patent and that said Letters Patent is hereby corrected as shown below:

Column 15, line 13, "is" should be --in--;
          line 29, before "(0.00" insert --$\Longrightarrow$--;
          line 32, before "(0.01" insert --$\Longrightarrow$--.

Column 18, line 65, "(C/A)" should be --C/A--.

Column 19, line 3, "(D"/A)-(BC/A$^2$)" should be --D"/A-BC/A$^2$--;
          line 15, "(D/A)-(B"-" should be --D/A-B"- --;
          line 16, "C/A$^2$)" should be --C/A$^2$--;
          line 26, "(D"/A)-(B-" should be --D"/A-B- --;
          line 27, "C/A$^2$)" should be --C/A$^2$--.

Column 20, line 7, "(D'-" should be --D'- --;
          line 8, "'/A)-(BC/A$^2$)" should be --'/A-BC/A$^2$--;
          line 12, "(-" should be -- - --;
          line 13, "D/A)-(B"C/A$^2$)" should be --D/A-B"C/A$^2$--.

Signed and Sealed this

Twenty-third Day of February 1982

[SEAL]

Attest:

*Attesting Officer*

GERALD J. MOSSINGHOFF

*Commissioner of Patents and Trademarks*